(12) United States Patent
Han et al.

(10) Patent No.: US 11,886,940 B2
(45) Date of Patent: Jan. 30, 2024

(54) NETWORK INTERFACE CARD, STORAGE APPARATUS, AND PACKET RECEIVING METHOD AND SENDING METHOD

(71) Applicant: HUAWEI TECHNOLOGIES CO., LTD., Guangdong (CN)

(72) Inventors: Zhaojiao Han, Shenzhen (CN); Xindong Luo, Shenzhen (CN); Xiaopeng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/157,402

(22) Filed: Jan. 20, 2023

(65) Prior Publication Data

US 2023/0267022 A1    Aug. 24, 2023

Related U.S. Application Data

(63) Continuation of application No. PCT/CN2021/091709, filed on Apr. 30, 2021.

(30) Foreign Application Priority Data

Jul. 31, 2020    (CN) .......................... 202010759858.1

(51) Int. Cl.
   *G06F 9/54*    (2006.01)

(52) U.S. Cl.
   CPC ........ *G06F 9/546* (2013.01); *G06F 2209/544* (2013.01); *G06F 2209/548* (2013.01)

(58) Field of Classification Search
   CPC ............... G06F 9/546; G06F 2209/544; G06F 2209/548

See application file for complete search history.

(56) References Cited

U.S. PATENT DOCUMENTS

| | | | |
|---|---|---|---|
| 11,308,024 B2 * | 4/2022 | Chen | H04L 67/1097 |
| 2016/0212214 A1 | 7/2016 | Rahman et al. | |
| 2017/0149920 A1 * | 5/2017 | Sammatshetti | G06F 3/061 |
| 2017/0177541 A1 * | 6/2017 | Berman | G06F 3/0656 |
| 2022/0058146 A1 * | 2/2022 | Balakrishnan | G06F 3/067 |

FOREIGN PATENT DOCUMENTS

WO    2018102416 A1    6/2018

* cited by examiner

*Primary Examiner* — Bryan Y Lee
(74) *Attorney, Agent, or Firm* — James Harrison

(57) ABSTRACT

This application discloses a network interface card so as to improve reliability of a storage apparatus using an RDMA network and improve storage access performance of a single QP connection. A network interface card includes a parser and at least one shared connector, where the parser is configured to distribute a received first remote direct memory access RDMA packet to a first shared connector in the at least one shared connector; and the first shared connector is configured to establish a QP connection to a peer network device, and determine a first queue pair QP corresponding to a first controller based on the first RDMA packet, so as to implement communication with the first controller, where the first shared connector is separately connected to a plurality of controllers including the first controller, and one QP corresponding to each of the plurality of controllers corresponds to the first shared connector.

20 Claims, 19 Drawing Sheets

CONT.
FROM
FIG. 18A

CONT.
FROM
FIG. 18A

S1807. The first shared connector stores the first RDMA packet to a storage space corresponding to the first QP, and/or posts a CQE to a CQ associated with the first QP S1808. A consumer of a controller in which the first QP is located queries the newly-posted CQE in the CQ, parses the NVMe SQE information, and initiates data exchange S1809. A scheduler aggregates doorbell signals from QPs, and selects, from a plurality of QPs of a plurality of controllers in position, a second QP that is corresponding to a second shared connector and that has a message to be sent S1810. The second shared connector sends, to the host client, a message in a storage space corresponding to the second QP in a form of a second RDMA packet S1811. The second shared connector posts a CQE to a CQ associated with the second QP S1812. A consumer (for example, NoF protocol software) of a controller in which the second QP is located queries the newly-submitted CQE in the CQ

FIG. 18B

NETWORK INTERFACE CARD, STORAGE APPARATUS, AND PACKET RECEIVING METHOD AND SENDING METHOD

CROSS-REFERENCE TO RELATED APPLICATIONS

This application is a continuation of International Application No. PCT/CN2021/091709, filed on Apr. 30, 2021, which claims priority to Chinese Patent Application No. 202010759858.1, filed on Jul. 31, 2020. The disclosures of the aforementioned applications are hereby incorporated by reference in their entireties.

TECHNICAL FIELD

This application relates to the storage field, and in particular, to a network interface card, a storage apparatus, and a packet receiving method and sending method.

BACKGROUND

At present, much data is not stored locally, but stored in a remote storage apparatus. As shown in FIG. 1, embodiment of this disclosure, a system provides a storage system, including a storage apparatus 11 and a host client 12. The storage apparatus 11 is connected to the host client 12 by using a front-end fabric, and may provide a data storage service for a plurality of host clients 12. With rise of a solid state drive (SSD) based on a non-volatile memory express (NVMe), increasingly more front-end fabrics use an NVMe over fabric (NoF) network. Remote direct memory access (RDMA) is a standard of the NoF network, and can reduce a latency of accessing data by a storage apparatus.

As shown in FIG. 1, the storage apparatus 11 includes a plurality of controllers 111 and at least one network interface card (NIC) 112. When the front-end fabric uses an RDMA network, the host client may establish a one-to-one queue pair (QP) connection to one controller 111. This manner has low reliability. If a corresponding controller is faulty, the host client cannot access the storage apparatus. In addition, this manner has a very low performance because an access request of each host client can be processed by only one controller, which wastes a processing capacity of another controller. The host client may also separately establish one-to-one QP connections to a plurality of controllers. However, this manner also has low reliability because each controller accesses a specific storage space. If one or more corresponding controllers are faulty, the host client can access only a part of the storage space. The host client needs to detect a fault and rectify the fault.

SUMMARY

Embodiments of this disclosure provide a network interface card, a storage apparatus, and a packet receiving method and sending method, so as to improve reliability of a storage apparatus using an RDMA network and improve storage access performance of a single QP connection.

To achieve the foregoing objective, the following technical solutions are used in embodiments of this disclosure.

According to a first aspect, a network interface card is provided, including a parser and at least one shared connector, where the parser is configured to distribute a received first remote direct memory access RDMA packet to a first shared connector in the at least one shared connector; and the first shared connector is configured to establish a QP connection to a peer network device, and determine a first queue pair QP corresponding to a first controller based on the first RDMA packet, so as to implement communication with the first controller, where the first shared connector is separately connected to a plurality of controllers including the first controller, and one QP corresponding to each of the plurality of controllers is corresponding to the first shared connector.

The network interface card provided in this embodiment of this disclosure includes the parser and the at least one shared connector, where the parser is configured to distribute the received first remote direct memory access RDMA packet to the first shared connector in the at least one shared connector; and the first shared connector is configured to establish the QP connection to the peer network device, and determine the first queue pair QP corresponding to the first controller based on the first RDMA packet, so as to implement communication with the first controller, where the first shared connector is separately connected to the plurality of controllers including the first controller, and the QP corresponding to each of the plurality of controllers is corresponding to the first shared connector. For a network interface card on a storage apparatus side, only a shared connector is visible to a host client. However, the first shared connector may distribute the received RDMA packet received from the host client to controllers where different QPs are located for processing, so that a controller that cannot work normally can be masked. As long as one controller works normally, it can be ensured that the storage apparatus can provide a storage service. Therefore, reliability of the storage apparatus using an RDMA network can be improved. In addition, I/O command requests are distributed to controllers where different QPs are located for parallel processing. Compared with an existing solution in which RDMA messages connected to a same QP can be processed only by one fixed controller, performance of the network interface card can be improved by N times, where N is a quantity of controllers. Therefore, storage access performance of a single QP connection can be improved.

In a possible implementation, the first shared connector is further configured to: if the first RDMA packet is not an acknowledgment packet, store the first RDMA packet to a storage space corresponding to the first QP. In this implementation, the RDMA packet is stored.

In a possible implementation, the first shared connector is further configured to: if the first RDMA packet is a tail packet, a single packet, or an acknowledgment packet, post a completion queue entry CQE to a completion queue CQ associated with the first QP, where the CQE is used to indicate that an RDMA operation corresponding to the first RDMA packet is completed. This implementation indicates that the RDMA operation is completed.

In a possible implementation, the first shared connector is specifically configured to: if the first RDMA packet is an initial packet or a single packet of a SEND message, determine the first QP based on information in a non-volatile memory express NVMe submission queue entry SQE of the first RDMA packet; where the information in the NVMe SQE is corresponding to the first controller. This implementation describes how to enable the received RDMA packet to correspond to the QP.

In a possible implementation, the first shared connector is specifically configured to: if the first RDMA packet is an acknowledgment packet of an RDMA WRITE message, an acknowledgment packet of a SEND message, or an initial packet or a single packet of an RDMA READ response message, determine the first QP based on a packet sequence number of the first RDMA packet and a correspondence between a packet sequence number of a second RDMA packet and the first QP; where the second RDMA packet is an RDMA packet sent by the first QP; the packet sequence number of the first RDMA packet is corresponding to the packet sequence number of the second RDMA packet; when the first RDMA packet is the acknowledgment packet of the RDMA WRITE message, the second RDMA packet belongs to an RDMA WRITE message; when the first RDMA packet is the acknowledgment packet of the SEND message, the second RDMA packet belongs to a SEND message; and when the first RDMA packet is the initial packet or the single packet of the RDMA READ response message, the second RDMA packet belongs to an RDMA READ request message. This implementation describes how to enable the received RDMA packet to correspond to the QP.

In a possible implementation, the first shared connector is further configured to: if the first RDMA packet is an initial packet, store a correspondence between an initial packet of a message to which the first RDMA packet belongs and the first QP. After the correspondence between the initial packet and the first QP is stored, a subsequently received middle packet or tail packet that belongs to a same RDMA message as the initial packet may also correspond to the first QP, so that the initial packet, the middle packet, and the tail packet of the same RDMA message are processed by the same QP.

In a possible implementation, the first shared connector is further configured to: if the first RDMA packet is a tail packet or a middle packet, determine an initial packet corresponding to the first RDMA packet based on a monotonically-increasing property of packet sequence numbers of segmented RDMA packets and the packet sequence number of the first RDMA packet; and determine the first QP based on the initial packet corresponding to the first RDMA packet and the correspondence. In this implementation, the initial packet, the middle packet, and the tail packet of the same RDMA message are processed by the same QP.

According to a second aspect, a network interface card is provided, including a scheduler and at least one shared connector, where the scheduler is configured to select, from a plurality of queue pairs QPs of a plurality of controllers in position, a second QP that is corresponding to a second shared connector and has a message to be sent, where the second shared connector is one of the at least one shared connector; and the second shared connector is configured to establish a QP connection to a peer network device, and send, to a host client, a message in a storage space corresponding to the second QP in a form of a second remote direct memory access RDMA packet; where the second shared connector is separately connected to the plurality of controllers, and one QP corresponding to each of the plurality of controllers is corresponding to the second shared connector.

Embodiments of this disclosure provide a network interface card and a storage apparatus, where the network interface card includes the scheduler and the at least one shared connector, and the scheduler is configured to select, from the plurality of QPs of the plurality of controllers in position, the second QP that is corresponding to the second shared connector and has a message to be sent, where the second shared connector is one of the at least one shared connector; and the second shared connector is configured to establish the QP connection to the peer network device, and send, to the host client, the message in the storage space corresponding to the second QP in the form of the second RDMA packet; where the second shared connector is separately connected to the plurality of controllers, and one QP corresponding to each of the plurality of controllers is corresponding to the second shared connector. The scheduler may select one QP from the plurality of QPs, and a corresponding second shared connector processes an RDMA message to be sent by the QP, so that a storage service can be provided as long as one controller can work normally. Therefore, reliability of the storage apparatus using an RDMA network can be improved. In addition, controllers in which different QPs are located can perform parallel processing on different I/O command requests. Compared with an existing solution in which RDMA messages connected to a same QP can be processed only by one fixed controller, performance of the network interface card can be improved by N times, where N is a quantity of controllers. Therefore, storage access performance of a single QP connection can be improved.

In a possible implementation, the second shared connector is further configured to: if the second RDMA packet belongs to an RDMA WRITE message, a SEND message, or an RDMA READ request message, store a correspondence between a packet sequence number of the second RDMA packet and the second QP. After the correspondence between the command message and the second QP is stored, if a data message corresponding to the command message is subsequently received, the data message may also correspond to the second QP, so that the command message and the corresponding data message are processed by the same QP.

In a possible implementation, the scheduler is specifically configured to select the second QP from a plurality of QPs corresponding to the second shared connector by using round robin. In this implementation, how to select the second QP is implemented.

According to a third aspect, a packet receiving method is provided, where the method is performed by the network interface card according to the first aspect and any one of implementations of the first aspect, and the method includes: A parser distributes a received first remote direct memory access RDMA packet to a first shared connector in at least one shared connector; the first shared connector establishes a QP connection to a peer network device, and determines a first queue pair QP corresponding to a first controller based on the first RDMA packet, so as to implement communication with the first controller, where the first shared connector is separately connected to a plurality of controllers including the first controller, and one QP corresponding to each of the plurality of controllers is corresponding to the first shared connector.

In a possible implementation, the method further includes: If the first RDMA packet is not an acknowledgment packet, the first shared connector stores the first RDMA packet to a storage space corresponding to the first QP.

In a possible implementation, the method further includes: If the first RDMA packet is a tail packet, a single packet, or an acknowledgement packet, the first shared connector posts a completion queue entry CQE to a completion queue CQ associated with the first QP, where the CQE is used to indicate that an RDMA operation corresponding to the first RDMA packet is completed.

In a possible implementation, the determining a first queue pair QP corresponding to a first controller based on the first RDMA packet includes: If the first RDMA packet is an initial packet or a single packet of a SEND message, the first shared connector determines the first QP based on information in a non-volatile memory express NVMe submission queue entry SQE in the first RDMA packet; where the information in the NVMe SQE is corresponding to the first controller.

In a possible implementation, the determining a first queue pair QP corresponding to a first controller based on the first RDMA packet includes: If the first RDMA packet is an acknowledgment packet of an RDMA WRITE message, an acknowledgment packet of a SEND message, or an initial packet or a single packet of an RDMA READ response message, the first shared connector determines the first QP based on a packet sequence number of the first RDMA packet and a correspondence between a packet sequence number of a second RDMA packet and the first QP; where the second RDMA packet is an RDMA packet sent by the first QP; the packet sequence number of the first RDMA packet is corresponding to the packet sequence number of the second RDMA packet; when the first RDMA packet is the acknowledgment packet of the RDMA WRITE message, the second RDMA packet belongs to an RDMA WRITE message; when the first RDMA packet is the acknowledgment packet of the SEND message, the second RDMA packet belongs to a SEND message; and when the first RDMA packet is the initial packet or the single packet of the RDMA READ response message, the second RDMA packet belongs to an RDMA READ request message.

In a possible implementation, the method further includes: If the first RDMA packet is an initial packet, the first shared connector stores a correspondence between an initial packet of a message to which the first RDMA packet belongs and the first QP.

In a possible implementation, the method further includes: If the first RDMA packet is a tail packet or a middle packet, the first shared connector determines an initial packet corresponding to the first RDMA packet based on a monotonically-increasing property of packet sequence numbers of segmented RDMA packets and the packet sequence number of the first RDMA packet; and determines the first QP based on the initial packet corresponding to the first RDMA packet and the correspondence.

According to a fourth aspect, a packet sending method is provided, where the method is applied to the network interface card according to the second aspect and any one of implementations of the second aspect, and the method includes: A scheduler selects, from a plurality of queue pairs QPs of a plurality of controllers in position, a second QP that is corresponding to a second shared connector and has a message to be sent, where the second shared connector is one of at least one shared connector; and the second shared connector establishes a QP connection to a peer network device, and sends, to a host client, a message in a storage space corresponding to the second QP in a form of a second remote direct memory access RDMA packet, where the second shared connector is separately connected to the plurality of controllers, and one QP corresponding to each of the plurality of controllers is corresponding to the second shared connector.

In a possible implementation, the method further includes: If the second RDMA packet belongs to an RDMA WRITE message, a SEND message, or an RDMA READ request message, the second shared connector stores a correspondence between a packet sequence number of the second RDMA packet and the second QP.

In a possible implementation, that a scheduler selects, from a plurality of queue pairs QPs of a plurality of controllers in position, a second QP that is corresponding to a second shared connector and has a message to be sent includes: The scheduler selects the second QP from a plurality of QPs corresponding to the second shared connector by using round robin.

According to a fifth aspect, a storage apparatus is provided, including the network interface card according to the first aspect and any implementation of the first aspect or the second aspect and any implementation of the second aspect and a plurality of controllers, where the network interface card is separately connected to each of the plurality of controllers.

For technical effects of the third aspect to the fifth aspect, refer to the technical effects of the first aspect and the second aspect.

BRIEF DESCRIPTION OF DRAWINGS

FIG. 18A and FIG. 18B are another schematic diagram of a process in which a host client and a storage apparatus complete I/O read/write by using an RDMA operation.

DESCRIPTION OF EMBODIMENTS

Figure 1:
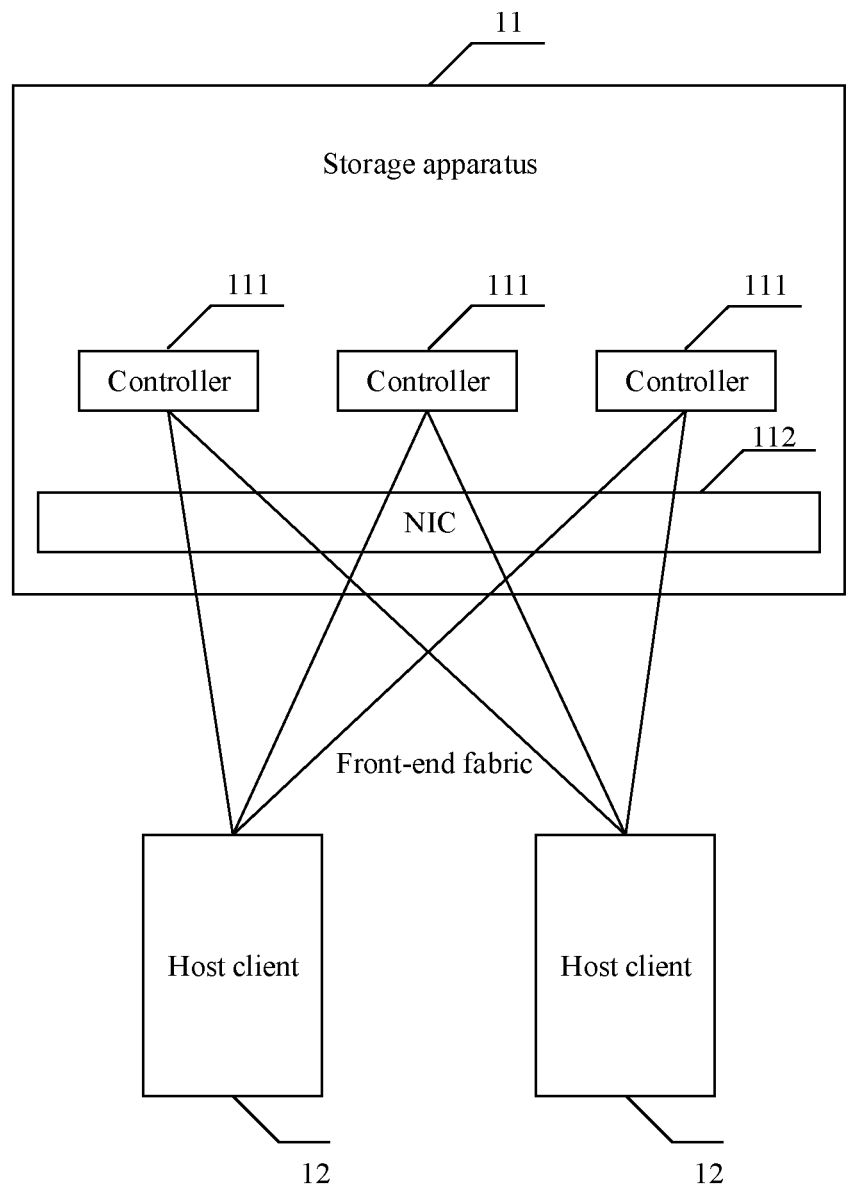
FIG. 1 is a schematic diagram of an architecture of a storage system according to an embodiment of this disclosure.

Terms such as "component", "module", and "system" used in this application are used to indicate computer-related entities. The computer-related entities may be hardware, firmware, combinations of hardware and software, software, or software in running. For example, a component may be but is not limited to a process that runs on a processor, a processor, an object, an executable file, a thread of execution, a program, and/or a computer. As an example, both a computing device and an application that runs on the computing device may be components. One or more components may reside within a process and/or a thread of execution, and the components may be located on one computer and/or distributed between two or more computers. In addition, these components may be executed from various computer-readable media that have various data structures. These components may communicate by using a local and/or remote process and according to, for example, a signal having one or more data packets (for example, data from one component, where the component interacts with another component in a local system or a distributed system, and/or interacts with other systems via a network such as the internet by using a signal).

First, some concepts in this application are described.

A storage apparatus involved in this application may be referred to as a storage server, a storage array, a blade server, or the like. A name is not limited. The storage apparatus may include at least one controller and at least one network interface card (NIC). The controller may include, but is not limited to, a processor and a memory. The processor runs an operating system and an application program.

The processor in this embodiment of this disclosure may be a chip. For example, the processor may be a field programmable gate array (FPGA), an application-specific integrated chip (ASIC), a system on chip (SoC), a central processing unit (CPU), a network processor (NP), digital signal processing (DSP), a micro controller unit (MCU), a programmable logic device (PLD), or another integrated chip.

The memory in this embodiment of this disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in the systems and methods described in this specification include but are not limited to these memories and any memory of another proper type.

The NIC in embodiments of this application may also be referred to as a network interface controller, a network adapter, a network card, or the like, or a local area network (LAN) adapter, and is a piece of computer hardware designed to allow a computer to communicate on a computer network.

To improve system reliability, a storage apparatus uses a multi-controller architecture solution to support a plurality of controllers to provide data storage services for one or more host clients. Mid- and high-end storage apparatuses use a multi-host NIC to implement a front-end fabric interface. A plurality of controllers share one NIC by using different high-speed serial peripheral component interconnect express (PCIe) channels, and each controller serves as an independent network node.

The storage apparatus is connected to a host client by using a front-end fabric, and may provide a data storage service for a plurality of host clients. With rise of NVMe SSDs, a protocol used by a host client to access a storage apparatus has transitioned from a small computer system interface (SCSI) to NVMe. Accordingly, a front-end fabric has migrated from a fiber channel (FC) network, a transmission control protocol/internet protocol (TCP/IP) network to a NoF network.

A NoF protocol supports operations of a memory type and a message type, PCIe supports operations of a memory type, an FC supports operations of a message type, and RDMA supports operations of a memory type and a message type.

For RDMA, data in a storage space of a storage apparatus is transmitted as a message to a storage space of the host client in a form of an RDMA packet over a front-end fabric; or data in a storage space of the host client is transmitted as a message to a storage space of the storage apparatus in the form of an RDMA packet over a front-end fabric. These transfer and copy operations are primarily performed by the network interface card (for example, an RDMA network interface card (RNIC)) of the storage apparatus and the host client, do not require execution by a processor and therefore do not affect performance of the host client.

Currently, a hardware implementation of RDMA includes an InfiniBand (IB), an RDMA over converged Ethernet (RoCE) (including RoCEv1 and RoCEv2), an internet wide area RDMA protocol (iWARP), and the like. Infiniband is a network designed specially for RDMA, ensuring reliable transmission at a hardware level. Both RoCE and iWARP are Ethernet-based RDMA technologies and support corresponding verbs interfaces. RoCE also supports hardware-level reliable transmission.

Figure 2:
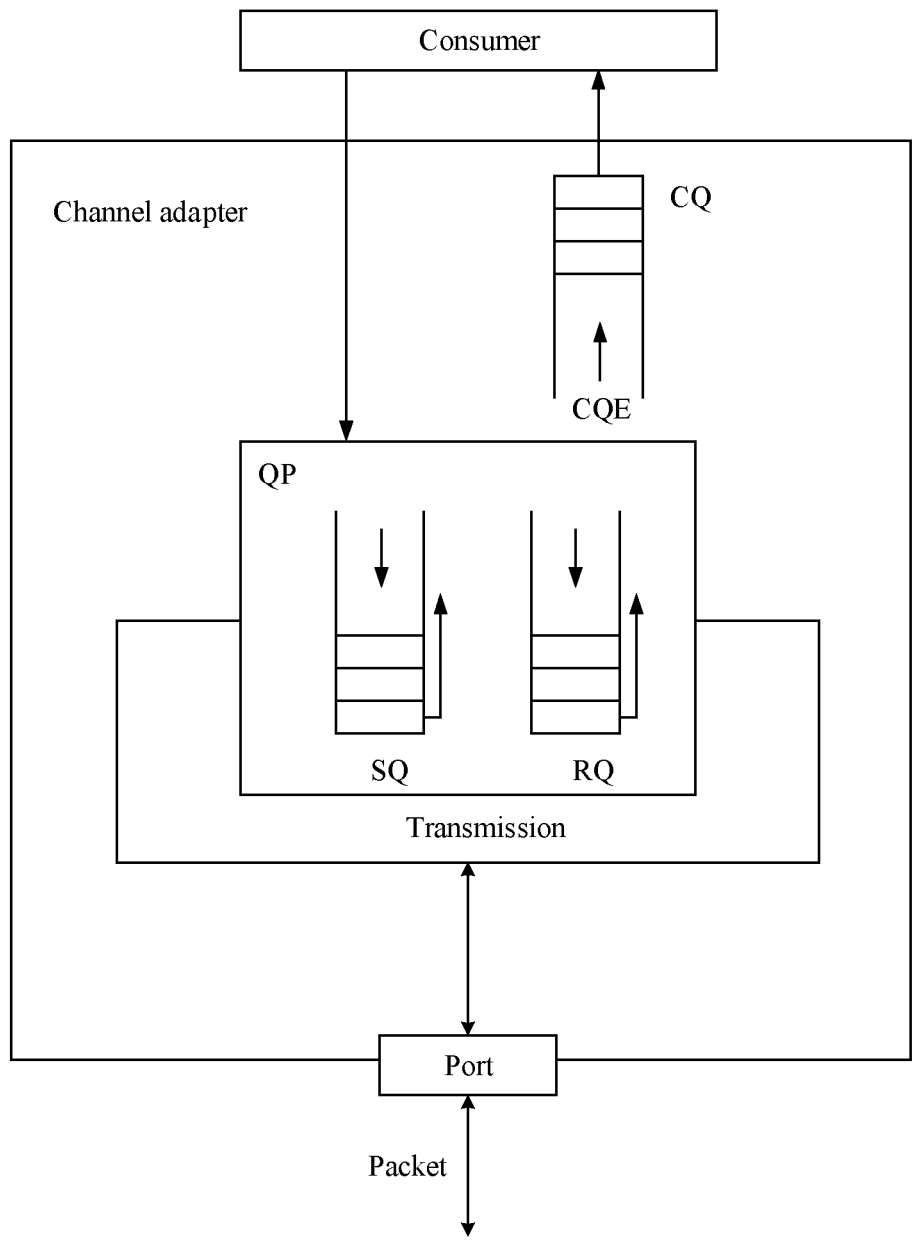
FIG. 2 is a schematic diagram of a QP according to an embodiment of this disclosure.

As shown in FIG. 2, RDMA is a transport layer network protocol that uses a queue pair (QP) to implement sending and receiving of data (as a message) of a consumer in a channel adapter (CA). Each QP includes one send queue (SQ) and one receive queue (RQ), where the SQ is responsible for sending a message and the RQ is responsible for receiving a message. The SQ and the RQ of each QP may be associated with one completion queue (CQ). Each QP has its own connection context for maintaining a connection status thereof. The SQ, the RQ, and the CQ also have their own queue context for maintaining their queue usage statuses.

The consumer in embodiments of this application refers to a main body that uses the QP to send and receive a message, and generally refers to a software process, for example, NoF protocol software.

When sending a message, the consumer posts a work queue element (WQE) to an SQ in a QP of a local node of the consumer (as a requester). The WQE includes an RDMA operation type, an address pointing to a storage space of the message to be transmitted, and a size of the message to be transmitted. Data to be transmitted is used as one message, a length of the message ranging from 0 to 2G bytes is supported. The network interface card segments the data pointed to by the WQE into packets based on a path maximum transmission unit (PMTU), and then sends the packets to a network. When the network interface card has completed transmitting all content of a message pointed to by one WQE, the network interface card posts a completion queue element (CQE) to a CQ associated with the SQ, to notify the consumer that an RDMA operation indicated by one WQE posted by the consumer, has been completed.

For receiving of a SEND message: Before receiving a message, the consumer posts in advance one WQE to an RQ in a QP of the local node of the consumer (as a responder). The WQE includes a pointer of a storage space that can store data and a size of the storage space that can store data. After receiving data from a front-end fabric, the network interface card writes the data to the storage space pointed to by the WQE of the RQ. When the network interface card has completed receiving the data, the network interface card posts a CQE to a CQ associated with the RQ to notify the consumer that the network interface card has completed reception of an RDMA message. For receiving of an RDMA READ response message: The network interface card writes received data to a storage space pointed to by a WQE of a corresponding RDMA READ operation. For receiving of a tail packet or a single packet of the RDMA READ response message: After the network interface card completes receiving the data, the network interface card posts a CQE to the CQ associated with the SQ to notify the consumer that an RDMA READ operation indicated by a WQE posted by the consumer has been completed. For receiving of an acknowledgment packet of an RDMA WRITE message or an RDMA SEND message: The network interface card posts a CQE to the CQ associated with the SQ to notify the consumer that an RDMA WRITE operation or an RDMA SEND operation indicated by a WQE posted by the consumer has been completed. For a SEND message, an RDMA READ response message, and an acknowledgment packet of an RDMA WRITE message, see the following description.

Figure 3:
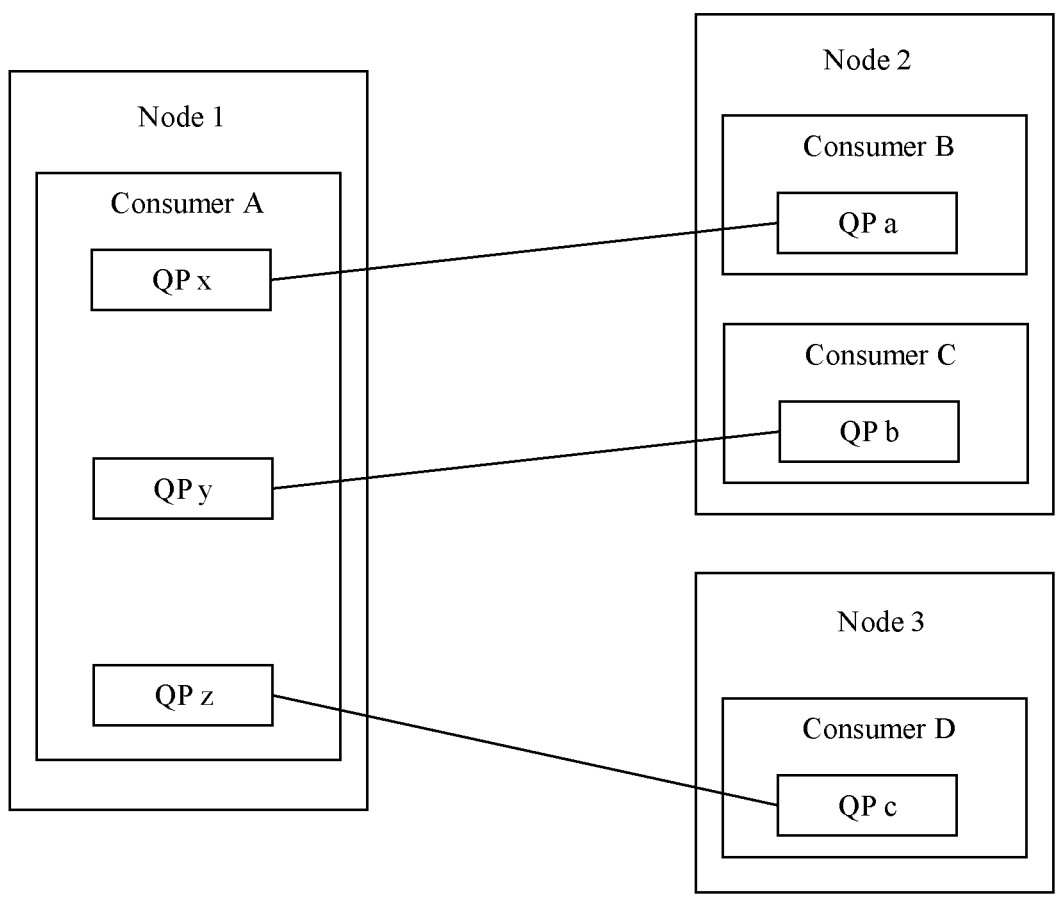
FIG. 3 is a schematic diagram of a QP connection of a reliable connection according to an embodiment of this disclosure.

RDMA supports a QP connection of a reliable connection and a QP connection of an unreliable connection. The QP connection of a reliable connection supports only a one-to-one communication model. To be specific, one QP on one node can establish a QP connection to only one QP of another node, and no QP can establish QP connections to a plurality of QPs of another node at the same time. For example, as shown in FIG. 3, a QP x of a consumer A of a node 1 establishes a QP connection to a QP a of a consumer B of a node 2, and the QP x of the consumer A of the node 1 cannot establish a QP connection to another QP (for example, a QP b or a QP c) at the same time. The NoF communicates by using RDMA that supports a QP connection of a reliable connection.

A packet that is of a QP connection of a reliable connection and received in RDMA should comply with a strictly monotonic increasing requirement. The responder decides, based on whether packet sequence numbers (PSN) in successively received packets are strictly monotonically increasing, whether to receive the packets. As shown in A in FIG. 4, only when PSNs of packets are strictly monotonically increasing (for example, the PSNs of the packets are equal to n, n+1, n+2, and n+3 in sequence), the responder can receive the packets. As shown in B in FIG. 4, when PSNs of packets jump (for example, a PSN n+2 of a packet is missing), the responder discards all subsequent packets of the QP whose PSNs are not strictly monotonically increasing. As shown in C in FIG. 4, when a PSN of a packet is repeated with a PSN of a received packet (for example, a packet whose PSN is n+1 is repeatedly received), the responder discards the repeated packet.

A message-type operation supported by RDMA includes a send operation, which involves a processor and is applicable to transmission of a control-type packet (or referred to as a command message).

A memory-type operation supported by RDMA includes an RDMA READ operation and an RDMA WRITE operation. These operations do not involve a processor, and data reading or writing is completed by a network interface card operating a storage space, and are applicable to transmission of a data-type packet (or referred to as a data message).

The following separately describes the send operation, the RDMA READ operation, and the RDMA WRITE operation.

Send Operation

The send operation may also be referred to as a push operation or having channel semantics. A requester pushes data to a responder without needing to know a storage location of the data in the responder. A channel adapter on the responder places the data into a next available storage space of a QP of the responder. The storage space is indicated by a WQE at the head in an RQ of the QP.

The requester may initiate a send operation by sending a send message, where the message includes data to be pushed to the responder. A length of the data may be between 0 bytes and $2^{31}$ (2G) bytes. If the length of the data is greater than a path maximum transmission unit (PMTU), the data is segmented into a plurality of packets based on a size of the PMTU, and the responder recombines the packets to obtain the data. For a reliable connection, if the data is a short message (that is, the data does not need to be segmented into a plurality of packets), the responder sends an acknowledgment (ACK) packet to the requester for each packet. If the data is a long message (that is, the data is segmented into a plurality of packets), the responder may send an acknowledgment packet (ACK) to the requester for each packet, or send one acknowledgment packet to the requester for a plurality of consecutive packets of a same message, or send an acknowledgment packet to the requester for a tail packet of the message. In addition, regardless of whether the data is a short message or a long message, the responder may send one acknowledgment (ACK) packet for a plurality of previously received packets. For example, an acknowledgment packet for a SEND message whose PSN is X may be used to acknowledge that a message whose PSN is less than X before the SEND message has been successfully received by the responder.

Each SEND message may include four-byte immediate data (ImmDt). If immediate data needs to be included, the immediate data is included in an additional header field of the last packet of the SEND message (an immediate data extended transport header or an ImmDt field).

Figure 5A:
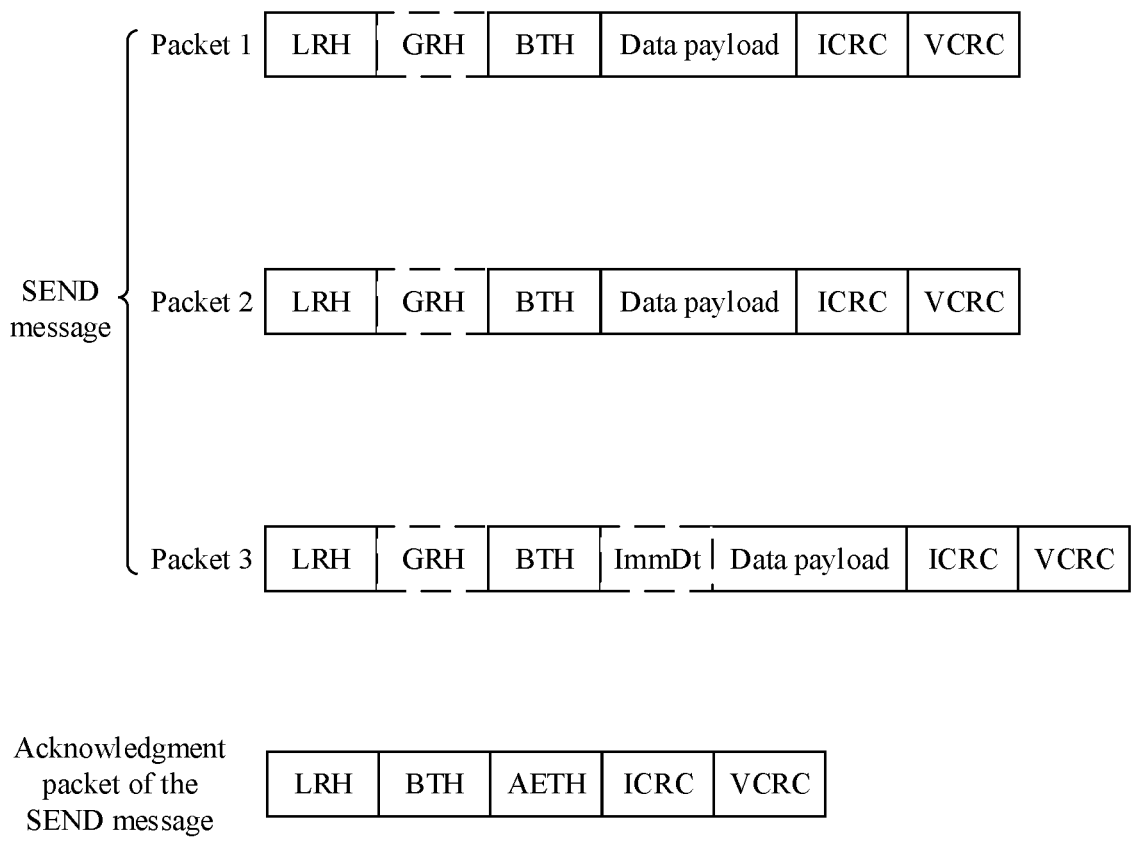
FIG. 5A is a schematic diagram of a structure of an IB protocol-based SEND message and an acknowledgment packet of the SEND message according to an embodiment of this disclosure.
Figure 5B:
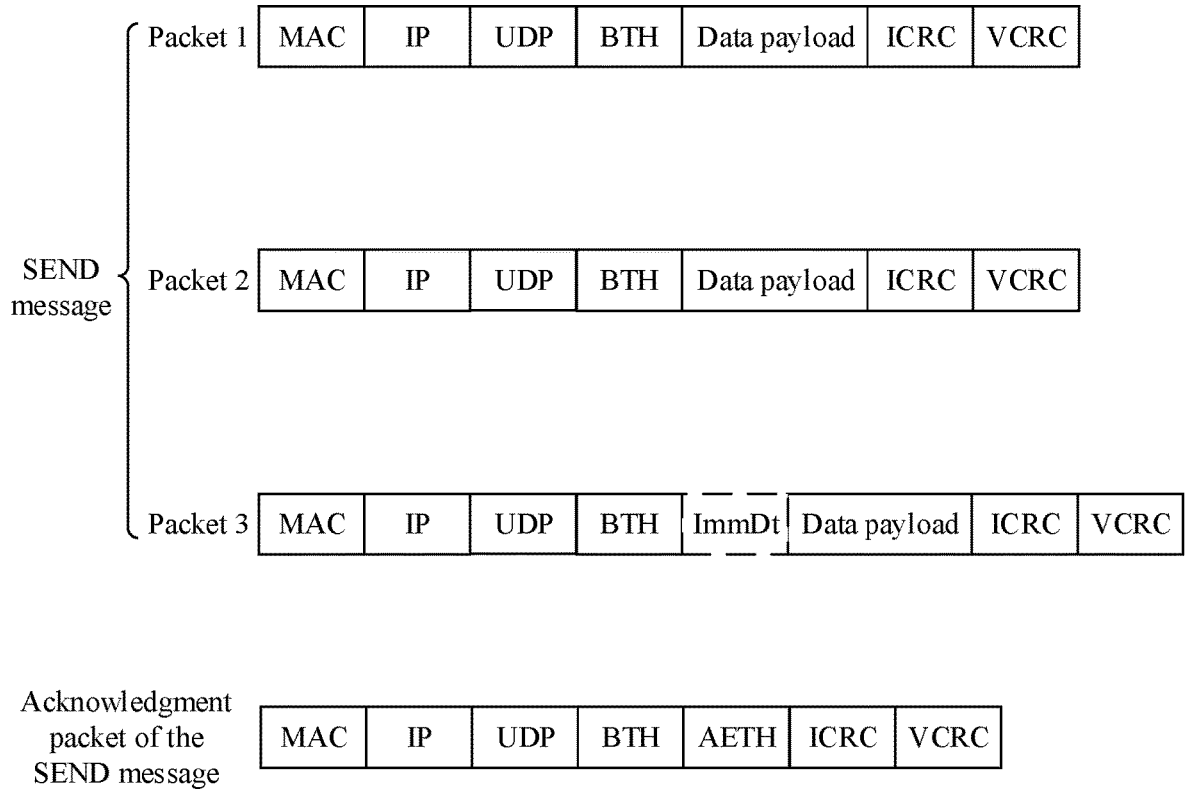
FIG. 5B is a schematic diagram of a structure of an RoCEv2 protocol-based SEND message and an acknowledgment packet of the SEND message according to an embodiment of this disclosure.
Figure 6:
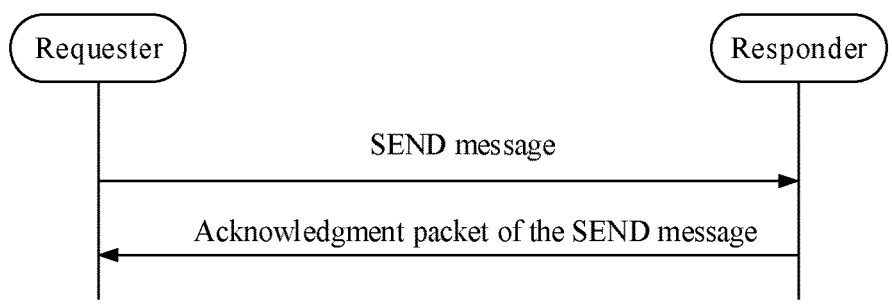
FIG. 6 is a schematic diagram of an interaction process between a requester and a responder of a reliable connection according to an embodiment of this disclosure.

For example, it is assumed that a SEND message is segmented into three packets, a structure of an IB protocol-based SEND message and a structure of an acknowledgment packet of the SEND message are shown in FIG. 5A, and a structure of an RoCEv2 protocol-based SEND message and a structure of an acknowledgment packet of the SEND message are shown in FIG. 5B. An interaction process between a requester and a responder of a reliable connection is shown in FIG. 6.

A local route header (LRH) field is used to perform routing by using a switch in a subnet.

A global route header (GRH) field is used to route to a destination outside a local subnet of a sender.

An invariant CRC (ICRC) field covers all fields that should not be changed for a packet, and CRC check is performed on these fields.

A variable CRC (VCRC) field covers all fields of a packet, and CRC check is performed on these fields.

An ACK extended transport header (AETH) includes an additional transport field of an acknowledgment packet, and the ACK extended transport header is contained in each acknowledgment packet of a SEND message.

A media access control (MAC) field is used for Layer 2 forwarding by using a switch in an Ethernet subnet.

An internet protocol (IP) field is used for Layer 3 forwarding by using a switch.

A user datagram protocol (UDP) field is used to indicate that a payload of a packet is an RDMA message.

A base transport header (BTH) field is used to indicate a destination QP, an operation code, a packet sequence number (PSN), and a partition. An operation code (OpCode) field in the BTH field determines start and end of a SEND message.

For a SEND message, if a length of data is less than or equal to a PMTU, the BTH operation code "SEND Only" or "SEND Only with Immediate" is used, indicating that the message cannot be split (that is, a single packet).

If the length of the data is zero, the BTH operation code "SEND Only" or "SEND Only with Immediate" is used, and there is no data payload field in the message. For a SEND message whose BTH operation code is "SEND Only", other fields are shown in a packet 1 in FIG. 5A or FIG. 5B. For a SEND message whose BTH operation code is "SEND Only with Immediate", other fields are shown in a packet 3 in FIG. 5A or FIG. 5B.

If the length of the data is greater than the PMTU, a BTH operation code of the first packet is "SEND First", indicating that the packet is an initial packet, a BTH operation code of a middle packet is "SEND Middle", indicating that the packet is a middle package, and a BTH operation code of the last packet is "SEND Last" or "SEND Last with Immediate", indicating that the packet is a tail packet.

For an acknowledgment packet of the SEND message, the BTH operation code is "Acknowledge".

For a given QP of the requester, once a send operation of a plurality of packets is started, no other SEND message, RDMA WRITE message, or RDMA READ request message can be sent before a packet with the operation code "SEND Last" or "SEND Last with Immediate".

The responder does not know a final length of the data until the last packet with the operation code "SEND Last" or "SEND Last with Immediate" arrives.

It should be noted that, after receiving a single packet or a tail packet of the SEND message, the responder reports a CQE to a CQ associated with an RQ of the local node, and after completing a sending process of the SEND operation (receiving an acknowledgment packet corresponding to the single packet or the tail packet of the SEND message), the requester then posts a CQE to a CQ associated with an SQ of the local node.

RDMA Write Operation

The RDMA write operation is used by a requester to write data to a storage space of a responder.

Before the requester is allowed to perform an RDMA write operation, the responder first allocates a storage space for a QP (or a QP group) of the responder to access. A channel adapter on the responder associates a 32-bit M_Key key with a virtual address of the storage space. The responder sends the virtual address of the storage space, a length of the storage space, and the M_Key key to the requester that can access the memory area. For example, the information above may be sent to the requester by using the foregoing send operation.

The requester may initiate an RDMA write operation by sending an RDMA WRITE message, where the message includes data to be written to the responder, a virtual address of the storage space of the responder, a length of the data, and an M_Key key. The length of the data may range from 0 bytes to $2^{31}$ bytes. Similar to the send operation, if the length of the data is greater than the PMTU, the data is segmented into a plurality of packets based on the size of the PMTU, and the responder recombines the packets to obtain the data. For a reliable connection, if the data is a short message (that is, the data does not need to be segmented into a plurality of packets), the responder sends an acknowledgment (ACK) packet to the requester for each packet; or if the data is a long message (that is, the data is segmented into a plurality of packets), the responder may send an acknowledgment (ACK) packet to the requester for each packet, or send an acknowledgment packet to the requester for a plurality of consecutive packets of same data, or send one acknowledgment packet to the requester for a tail packet of the packets. In addition, regardless of whether the data is a short message or a long message, the responder may send one acknowledgment (ACK) packet for a plurality of previously received packets. For example, an acknowledgment packet of an RDMA WRITE message whose PSN is X may be used to acknowledge that a message whose PSN is less than X before the RDMA WRITE message has been successfully received by the responder.

Figure 7A:
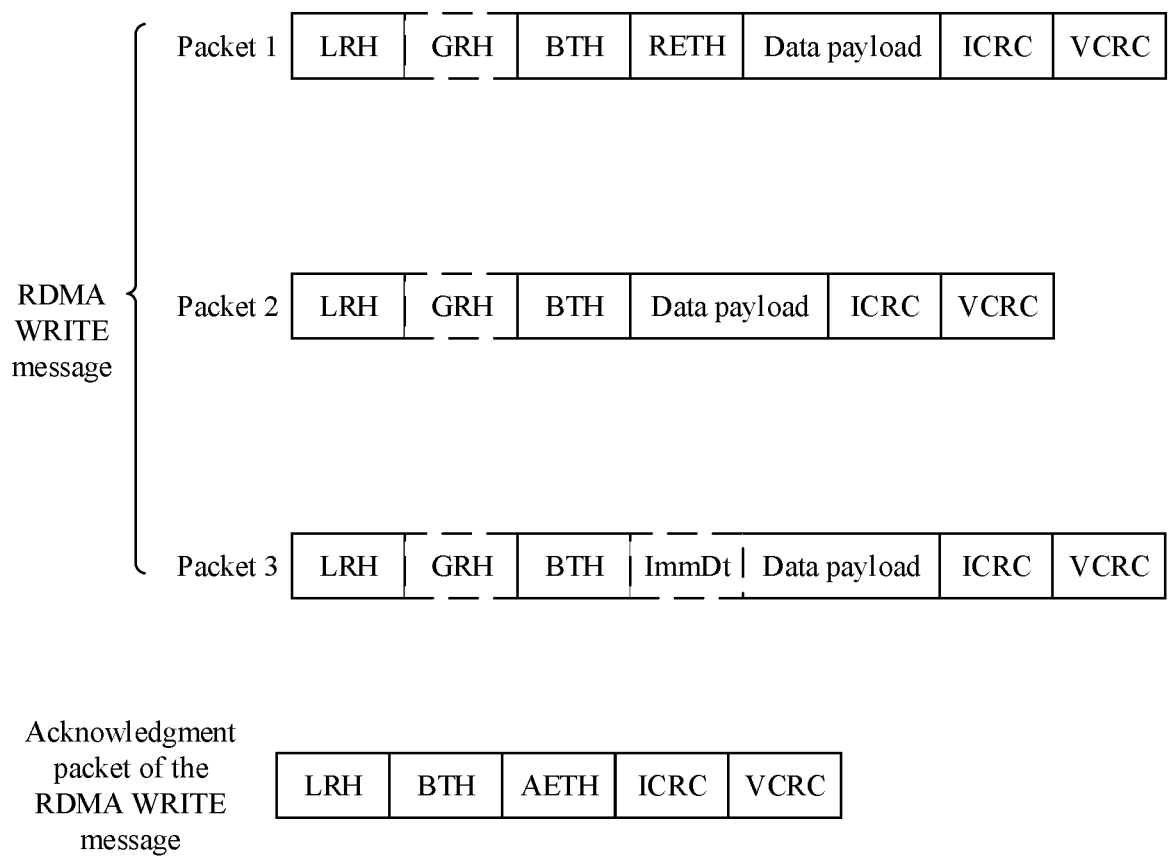
FIG. 7A is a schematic diagram of a structure of an IB protocol-based RDMA WRITE message and an acknowledgment packet of the RDMA WRITE message according to an embodiment of this disclosure.
Figure 7B:
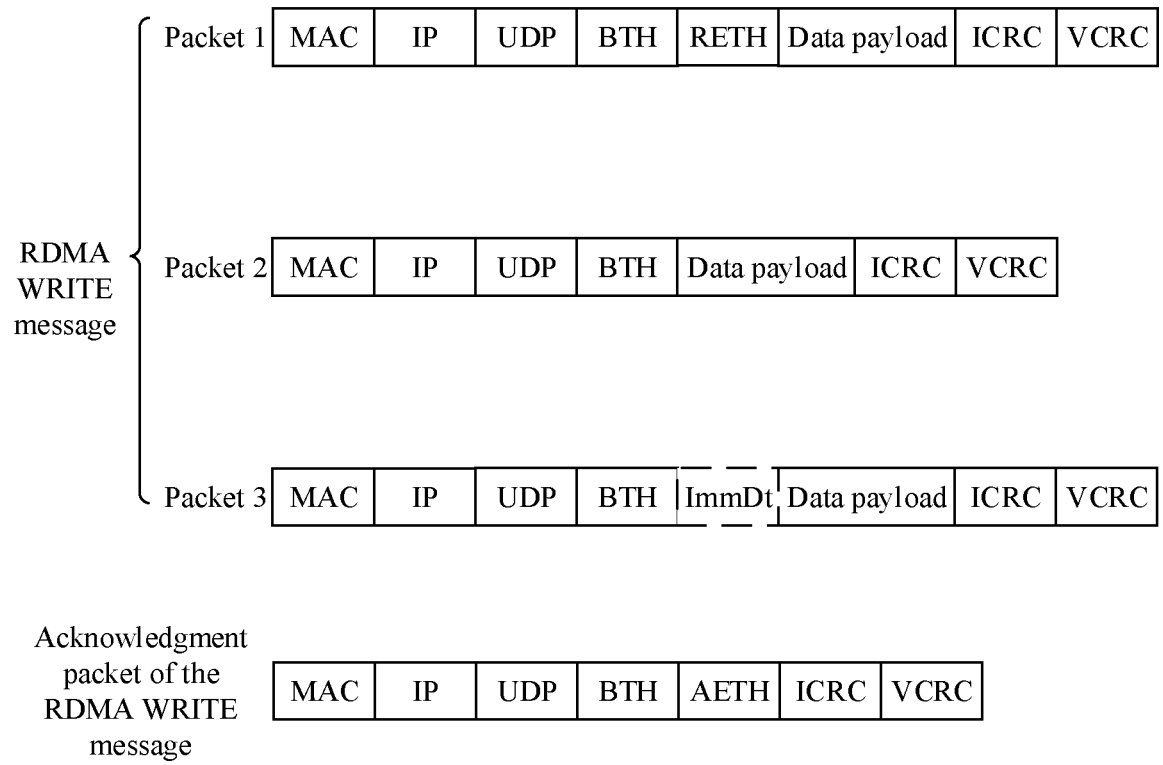
FIG. 7B is a schematic diagram of a structure of an RoCEv2 protocol-based RDMA WRITE message and an acknowledgment packet of the RDMA WRITE message according to an embodiment of this disclosure.
Figure 8:
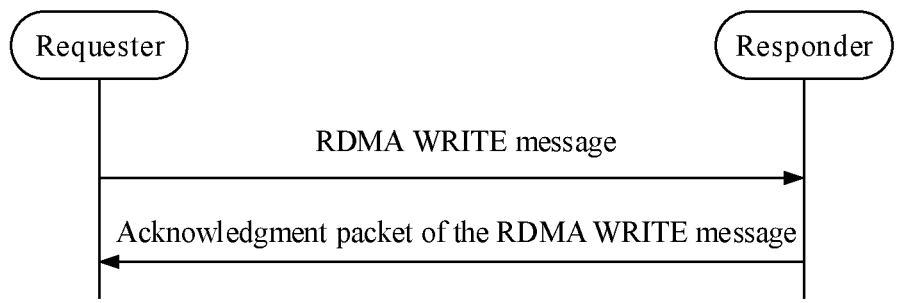
FIG. 8 is another schematic diagram of an interaction process between a requester and a responder of a reliable connection according to an embodiment of this disclosure.

For example, it is assumed that the RDMA WRITE message is segmented into three packets, a structure of an IB protocol-based RDMA WRITE message and a structure of an acknowledgment packet of the RDMA WRITE message are shown in FIG. 7A, and a structure of an RoCEv2 protocol-based RDMA WRITE message and a structure of an acknowledgment packet of the RDMA WRITE message are shown in FIG. 7B. An interaction process between a requester and a responder of a reliable connection is shown in FIG. 8.

An RDMA extended transport header (RETH) includes an additional transport field of an RDMA operation. For example, a virtual address of a target storage space, a length of data in the RDMA operation, and an M_Key key are included. The responder determines, based on the M_Key key, that the requester has permission to access the corresponding virtual address, and stores the data indicated by the length to the storage space pointed to by the virtual address.

Similar to the SEND operation, an operation code field (OpCode field) in a BTH field determines start and end of an RDMA WRITE message:

For an RDMA WRITE message, if a length of data is less than or equal to a PMTU, the BTH operation code "RDMA WRITE Only" or "RDMA WRITE Only with Immediate" is used to indicate that the message cannot be split (that is, a single packet).

If the length of the data is zero, the BTH operation code "RDMA WRITE Only" or "RDMA WRITE Only with Immediate" is used, and there is no data payload field in a packet. For an RDMA WRITE message whose BTH operation code is "RDMA WRITE Only", other fields are shown in a packet 1 in FIG. 7A or FIG. 7B. For an RDMA WRITE message whose BTH operation code is "RDMA WRITE Only with Immediate", an ImmDt field is added after the RETH field of the packet 1 shown in FIG. 7A or FIG. 7B, and other fields are shown in the packet 1.

If the length of the data is greater than the PMTU, a BTH operation code of the first packet is "RDMA WRITE first", indicating that the packet is an initial packet, a BTH operation code of a middle packet is "RDMA WRITE Middle", indicating that the packet is a middle packet, and a BTH operation code of the last packet is "RDMA WRITE Last" or "RDMA WRITE Last with Immediate", indicating that the packet is a tail packet.

For an acknowledgment packet of the RDMA WRITE message, the BTH operation code is "Acknowledge".

RDMA Read Operation

The RDMA read operation is a reverse operation of an RDMA write operation, and is used by the requester to read data in a storage space of the responder.

Before the requester is allowed to perform an RDMA read operation, the responder first allows the requester to access a virtual address of the responder. To be specific, a virtual address and a length of data to be read by using the RDMA read operation, and an M_Key key are sent to the requester. For example, the information above may be sent to the requester by using the foregoing send operation.

The requester may initiate the RDMA read operation by sending an RDMA READ request message, where the message includes a virtual address of a storage space of the responder, a length of data in the RDMA operation, and an M_Key key. The responder sends an RDMA READ response message to the requester, where the message includes the read data. The length of the data to be read may range from 0 bytes to $2^{31}$ bytes. If the length is greater than the PMTU, the data is segmented into a plurality of packets based on the size of the PMTU, so that the data is transmitted by using packets of a plurality of RDMA READ response messages. The requester recombines the packets to obtain the data. For a reliable connection, the RDMA READ response message does not have a corresponding acknowledgment packet. If the requester finds that the RDMA READ response message has packet loss, the requester re-initiates an RDMA read operation.

Figure 9A:
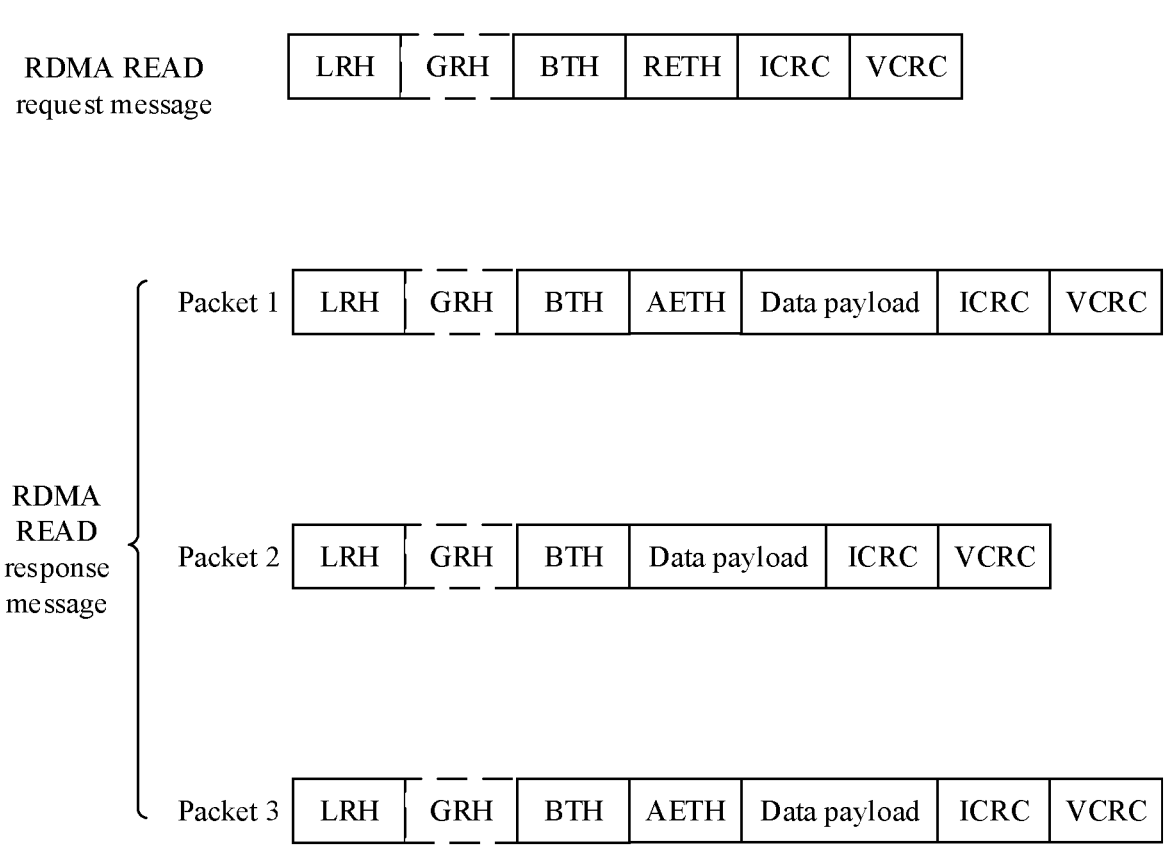
FIG. 9A is a schematic diagram of a structure of an IB protocol-based RDMA READ request message and an IB protocol-based RDMA READ response message according to an embodiment of this disclosure.
Figure 9B:
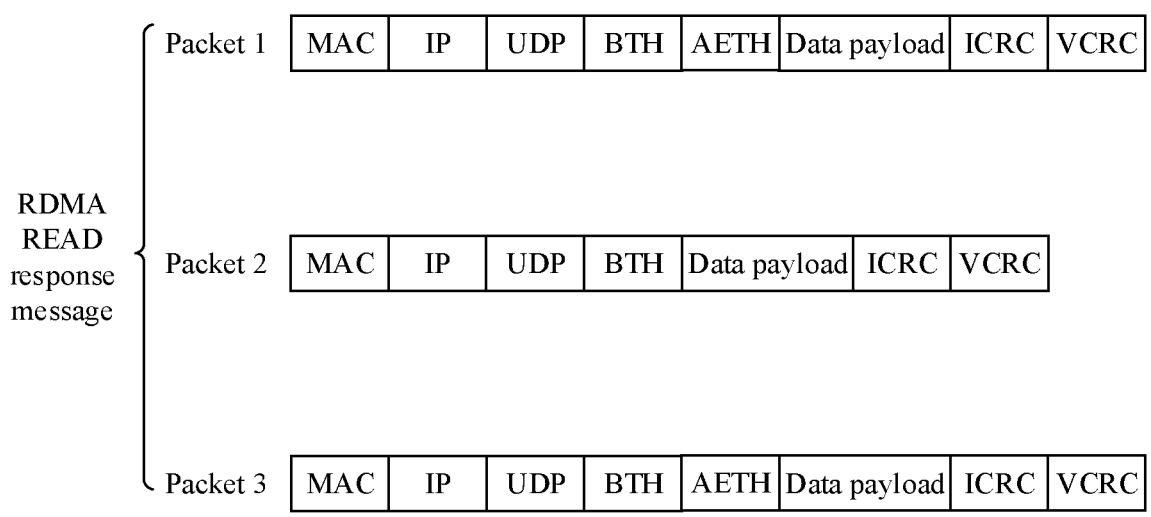
FIG. 9B is a schematic diagram of a structure of an RoCEv2 protocol-based RDMA READ request message and an RoCEv2 protocol-based RDMA READ response message according to an embodiment of this disclosure.
Figure 10:
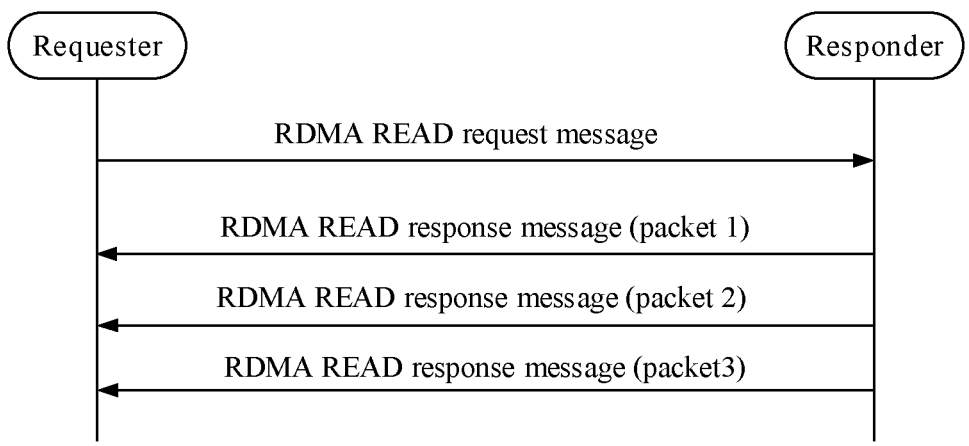
FIG. 10 is still another schematic diagram of an interaction process between a requester and a responder of a reliable connection according to an embodiment of this disclosure.

For example, it is assumed that the RDMA READ response message is segmented into three packets, a structure of an IB protocol-based RDMA READ request message and a structure of an IB protocol-based RDMA READ response message are shown in FIG. 9A, and a structure of an RoCEv2 protocol-based RDMA READ request message and a structure of an RoCEv2 protocol-based RDMA READ response message are shown in FIG. 9B. An interaction process between a requester and a responder of a reliable connection is shown in FIG. 10.

An operation code field (OpCode field) in a BTH field determines start and end of a message (the RDMA READ request message or the RDMA READ response message):

For the RDMA READ request message, the BTH operation code is "RDMA READ Request".

For the RDMA READ response message, if a length of data is less than or equal to a PMTU, the BTH operation code "RDMA READ Response Only" is used, indicating that the message cannot be split (that is, a single packet).

If the length of the data is zero, the BTH opcode "RDMA READ Response Only" is used, and no data payload field is present in the RDMA Read response message, but all other fields are shown as a packet 1 in FIG. 9A or FIG. 9B.

If the length of the data is greater than the PMTU, a BTH operation code of the first packet is "RDMA READ Response first", indicating that the packet is an initial packet, a BTH operation code of a middle packet is "RDMA READ Response Middle", indicating that the packet is a middle packet, and a BTH operation code of the last packet is "RDMA READ Response Last", indicating that the packet is a tail packet.

Figure 11:
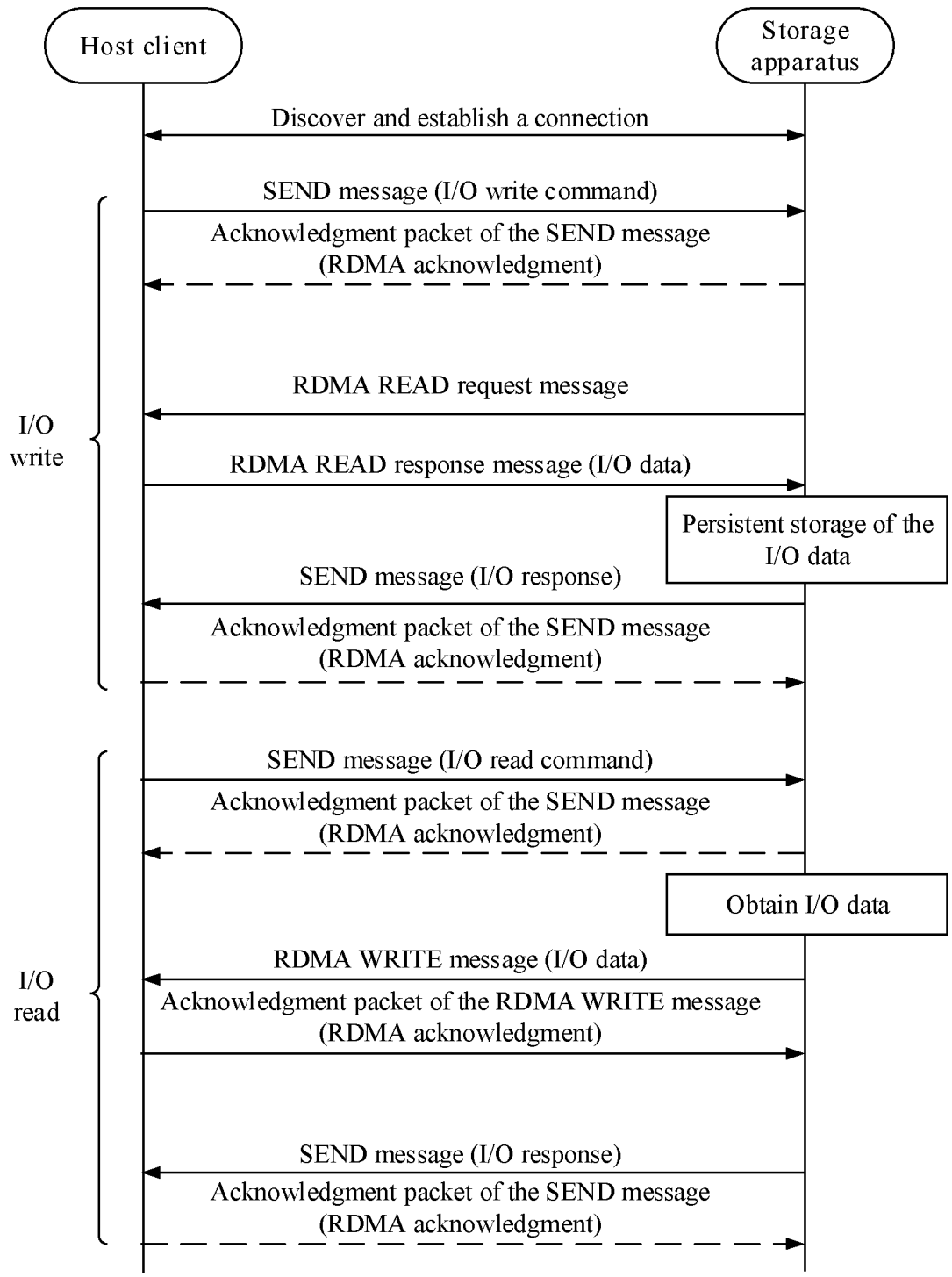
FIG. 11 is a schematic diagram of a process in which a host client and a storage apparatus complete I/O read/write by using an RDMA operation according to an embodiment of this disclosure.

FIG. 11 shows a process in which a host client and a storage apparatus complete I/O read/write by using the foregoing RDMA operation.

The host client first discovers the storage apparatus in a network and establishes a connection to the storage apparatus.

In a process in which the host client performs I/O write to the storage apparatus, the host client sends a SEND message to the storage apparatus, and a data payload of a packet thereof is an I/O write command. For a reliable connection, the storage apparatus may send an acknowledgment packet of the SEND message to the host client, indicating that the I/O write command is received. Then, the storage apparatus (as a requester) sends an RDMA READ request message to the host client (as a responder), and the host client sends an RDMA READ response message to the storage apparatus, where a data payload of a packet thereof is I/O data. After performing persistent storage on the I/O data, that is, after storing the I/O data in a storage medium such as a hard disk drive (HDD) or a solid state drive (SSD), the storage apparatus sends a SEND message to the host client, where a packet thereof includes an I/O response, indicating that the I/O write process is completed, and the host client sends an acknowledgment packet of the SEND message to the storage apparatus, indicating that the I/O response is received.

In a process in which the host client performs I/O read to the storage apparatus, the host client sends a SEND message to the storage apparatus, and a data payload of a packet thereof is an I/O read command. For a reliable connection, the storage apparatus may send an acknowledgment packet of the SEND message to the host client, indicating that the I/O read command is received. After the storage apparatus obtains the I/O data, that is, after the storage apparatus obtains the I/O data from a storage medium such as an HDD or an SSD, the storage apparatus (as a requester) sends an RDMA WRITE message to the host client (as a responder), where a data payload of a packet thereof is the I/O data, and the host client sends an acknowledgment packet of the RDMA WRITE message to the storage apparatus. The storage apparatus sends a SEND message to the host client, where a packet thereof includes an I/O response, indicating that the I/O read process is completed, and the host client sends an acknowledgment packet of the SEND message to the storage apparatus, indicating that the I/O response is received.

It can be learned that a complete I/O write process is to transfer command messages (such as a command request and a command response) through the SEND operation, and to transfer a data message through the RDMA READ operation; and a complete I/O read process is to transfer a command message through the SEND operation, and transfer a data message through the RDMA WRITE operation.

Figure 12:
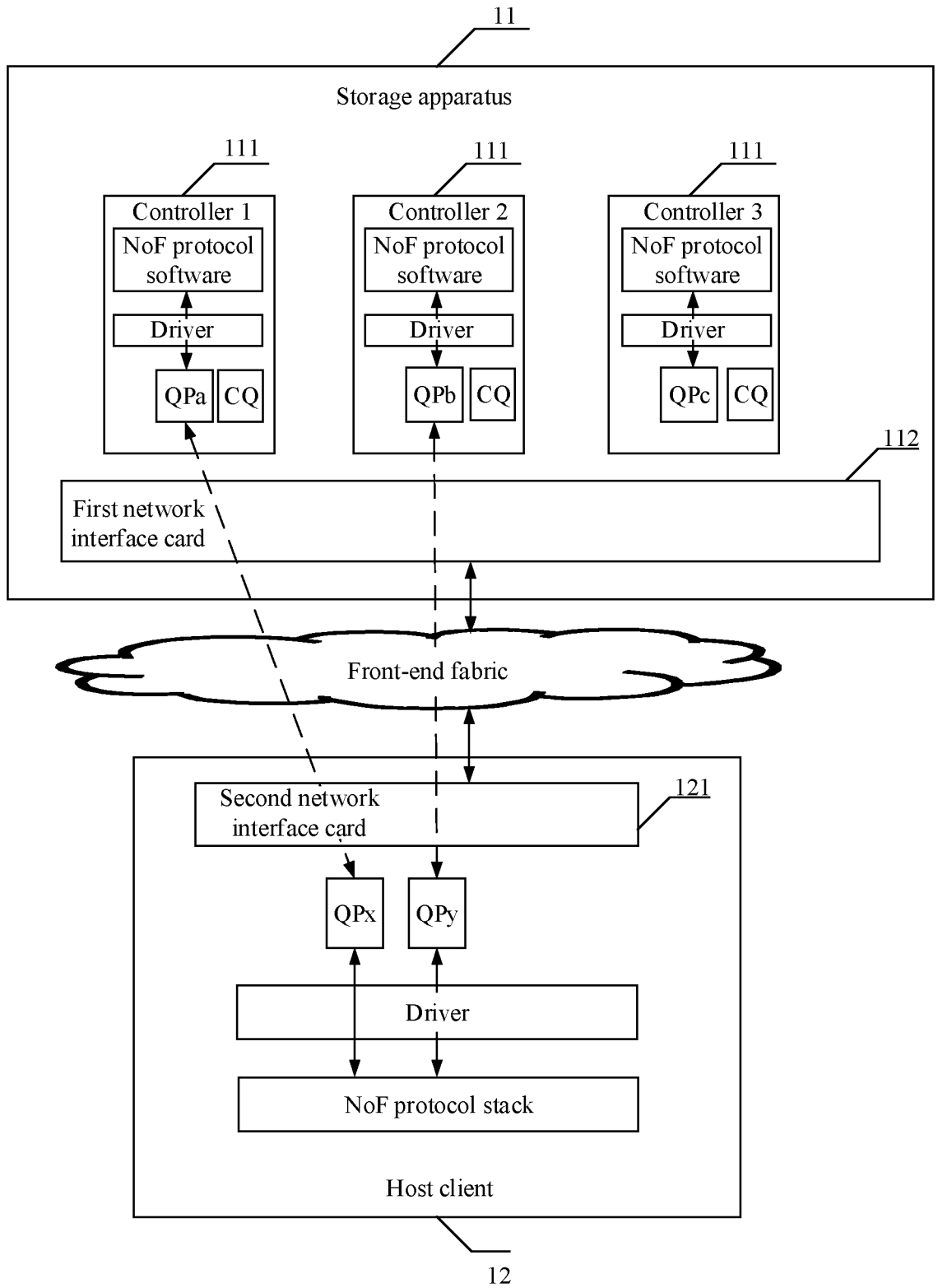
FIG. 12 is a schematic diagram of an architecture of another storage system according to an embodiment of this disclosure.

Based on the storage system shown in FIG. 1, as shown in FIG. 12, an architecture in which RDMA is used between the storage apparatus 11 and the host client 12 to implement a front-end fabric is shown in FIG. 12.

Each controller 111 of the storage apparatus 11 implements NoF protocol software (which may also be referred to as a NoF protocol stack) and a driver. The host client 12 also implements NoF protocol software and a driver. The NoF protocol software and the driver run in a processor. The NoF protocol software serves as an application program, and the driver provides the NoF protocol software with an interface to control a network interface card.

Each controller 111 of the storage apparatus 11 serves as one node and is corresponding to at least one QP. A plurality of controllers 111 share a first network interface card (for example, an RNIC) 112. The host client 12 includes a second network interface card (for example, an RNIC) 121 and may use one QP to establish a reliable connection to a QP of one controller 111 in the storage apparatus 11 as required by using the second network interface card 121, and may use a plurality of QPs to respectively establish reliable connections to a plurality of QPs of a plurality of controllers 111 of the storage apparatus 11 by using the second network interface card 121.

As described above, this manner has low reliability. If a corresponding controller is faulty, the host client cannot access the storage apparatus. In addition, this manner has very low performance. An access request of each host client can be processed by only one controller, which wastes a processing capacity of another controller. The host client may also establish a one-to-many QP connection to a plurality of controllers, but this manner also has low reliability because each controller accesses a specific storage space. If one or more corresponding controllers are faulty, the host client can access only a part of the storage space. In addition, a networking scale in this manner is small because a quantity of QP connections is limited. A larger quantity of QP connections occupied by each host client indicates a smaller quantity of host clients that can simultaneously gain access to the storage apparatus.

Figure 13:
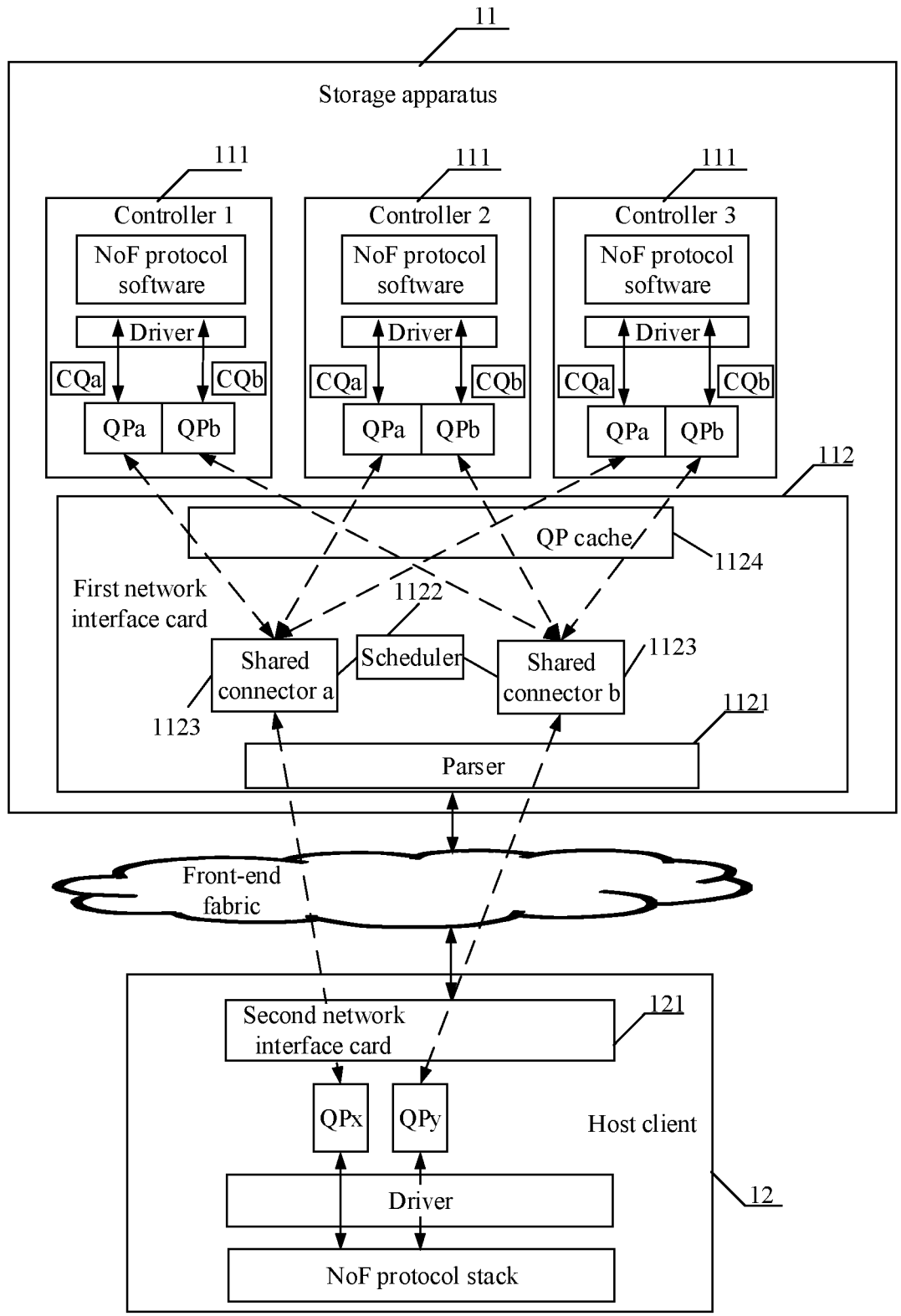
FIG. 13 is a schematic diagram of an architecture of still another storage system according to an embodiment of this disclosure.

Therefore, as shown in FIG. 13, an embodiment of this disclosure provides another network interface card, a storage apparatus, and a storage system.

The storage apparatus 11 includes a plurality of controllers 111 and at least one network interface card (for example, an RNIC) 112.

The network interface card 112 includes a parser 1121, a scheduler 1122, at least one shared connector 1123, and a QP cache 1124. The parser 1121, the scheduler 1122, and the at least one shared connector 1123 may be an application-specific integrated circuit (ASIC) chip module, and may be firmware burned to a programmable logic device (PLD), or may be a processor, a microprocessor, or a software module run by an embedded processor. This is not limited in this application.

At least one QP (which may also be referred to as an SQ/RQ pair, where the name is not limited) and a CQ associated with the at least one QP are established on each controller 111. The shared connector 1123 is separately connected to the plurality of controllers 111, and each of the plurality of controllers 111 and the shared connector 1123 are corresponding to one QP. The network interface card 112 implements an operation on the QP by caching WQEs (a WQE of an SQ and a WQE of an RQ) of QPs in the plurality of controllers 111 into the QP cache 1124 of the network interface card 112.

A request may be initiated by the host client 12 to establish at least one QP connection to the at least one shared connector 1123 of the storage apparatus 11, and the QP connection may be a reliable connection or an unreliable connection. To be specific, the storage apparatus 11 separately establishes at least one QP connection to the host client 12 (at least one QP of the host client 12) by using the at least one shared connector 1123, and each QP connection is corresponding to one shared connector 1123 and one QP of each controller 111. The foregoing one shared connector 1123 and one QP of each controller 111 may be collectively referred to as one QP group. That is, one QP connection is corresponding to one QP group, and is corresponding to one shared connector 1123 and one QP of each controller 111 in the QP group. A quantity of controllers corresponding to one QP connection may dynamically increase or decrease as the controllers are powered on or powered off.

The shared connector 1123 is visible to the host client 12, and each QP in the controller 111 is invisible to the host client 12. That is, the first network interface card 112 of the storage apparatus 11 communicates with the second network interface card 121 of the host client 12 by using the shared connector 1123, and establishes one QP connection to one QP of the host client 12.

A queue context in an RDMA QP in a standard protocol may be carried on the QP, and a connection context may be carried on the shared connector 1123. All QPs in one QP group use a same connection context and a set of PSNs that monotonically increase.

In a case that the storage apparatus 11 receives a first RDMA packet from the host client 12, the parser 1121 is configured to distribute the received first RDMA packet to one shared connector 1123 in the at least one shared connector 1123.

The shared connector 1123 is configured to establish a QP connection to a peer network device (for example, the host client), and determine a first QP corresponding to a first controller based on the first RDMA packet, so as to implement communication with the first controller, and notify a corresponding consumer of the first RDMA packet. The plurality of controllers 111 include the first controller.

Specifically, regardless of a command message or a data message, a same message may be segmented into a plurality of packets, and information that can be used for distribution generally exists only in the first packet of the message. The shared connector 1123 distributes, based on a load balancing principle, the first packet of an I/O command request to a controller 111 that works normally for storage, and stores a correspondence between the first packet and the controller 111. In this way, different I/O command requests and corresponding data messages from one host client 12 can be distributed to different controllers 111 for parallel processing, thereby improving processing performance. If a subsequent packet of the message is subsequently received, the shared connector 1123 may use a monotonically increasing property of RDMA transmission to enable the subsequent packet to correspond to the first packet, and distribute the subsequent packet to the corresponding controller 111 based on the corresponding first packet and the correspondence between the first packet and the controller 111. Therefore, distribution consistency of packets of a same message is ensured.

If command messages for different messages are received, the shared connector 1123 distributes, based on the load balancing principle, the command messages to controllers 111 that work normally for storage and store a correspondence between the command messages and the controllers 111, so that a plurality of command messages from one host client 12 can be distributed to different controllers 111 for parallel processing, thereby improving processing performance. After completing processing of an I/O read/write request message, the controller initiates an I/O data transmission operation. That is, the controller posts a WQE of a corresponding RDMA write operation or an RDMA read operation to a corresponding QP. After receiving an acknowledgment packet of the RDMA write operation or a response message of the RDMA read operation, the first shared connector distributes, based on a PSN of the first RDMA packet, the acknowledgment packet of the RDMA write operation or the response message of the RDMA read operation to a first QP of the first controller that initiates the operation, so as to maintain distribution consistency between the command message and the data message.

In a case that the storage apparatus 11 sends a second RDMA packet to the host client 12:

the scheduler 1122 is configured to select, from a plurality of QPs of a plurality of controllers 111 in position, a second QP with a message to be sent.

The shared connector 1123 is configured to send, to the host client 12, the second RDMA packet in a storage space corresponding to the second QP.

Specifically, after determining that the controller 111 needs to send a message, the scheduler 1122 selects a corresponding shared connector based on a scheduling algorithm to send the message, and the shared connector 1123 sends the message to a corresponding host client 12 by using a corresponding QP connection, thereby implementing fair sending. In addition, for messages on a same QP connection from different controllers 111, before the messages are sent to the host client 12, PSNs are ensured to be monotonically increasing, so that the host client 12 considers communicating with one QP of the storage apparatus 11.

In conclusion, the plurality of controllers 111 may work in parallel to provide storage services for a same QP connection. When a controller 111 is faulty, as long as one controller 111 works normally, subsequent messages may be redirected and distributed to the controller 111 that works normally for processing. Therefore, it is ensured that the host client 12 accesses the storage space in the storage apparatus 11, thereby improving reliability, and implementing an active-active (AA) function of the controller of the storage apparatus 11. In addition, different I/O command requests received by using a same QP connection may be distributed to controllers in which different QPs are located for parallel processing. Therefore, storage access performance of a single QP connection can be improved.

Figure 14:
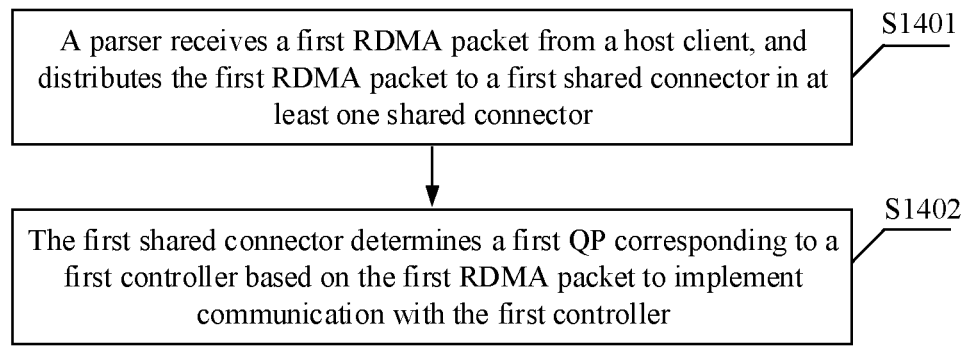
FIG. 14 is a schematic flowchart of a packet receiving method according to an embodiment of this disclosure.

For message receiving, a network interface card of a storage apparatus may perform a packet receiving method shown in FIG. 14. The method includes the following steps:

S1401. A parser receives a first RDMA packet from a host client, and distributes the first RDMA packet to a first shared connector in at least one shared connector.

A peer network device (for example, the host client) discovers the storage apparatus in a front-end fabric, and establishes at least one QP connection to the first shared connector of the storage apparatus by using at least one QP. In this way, the host client and the storage apparatus can transmit data to each other through the QP connection.

The first RDMA packet may be a packet of a command message or a packet of a data message. The packet of the command message includes a SEND message and an acknowledgment packet of the SEND message, and the packet of the data message includes an acknowledgment packet of an RDMA WRITE message and an RDMA READ response message.

The parser may determine a corresponding QP connection and a corresponding first shared connector based on a queue pair number (QPN) in the first RDMA packet, and distribute the first RDMA packet to the first shared connector. A QPN is a unique identifier of a QP connection, and therefore may be used to determine a corresponding QP connection.

As described above, one QP connection is corresponding to one QP group, and is corresponding to one shared connector and one QP corresponding to each controller in the QP group. Therefore, based on the QPN, not only the corresponding QP connection can be determined, the QP group corresponding to the QP connection and the shared connector and the QP in the QP group may also be determined.

S1402. The first shared connector determines a first QP corresponding to a first controller based on the first RDMA packet to implement communication with the first controller.

Figure 15:
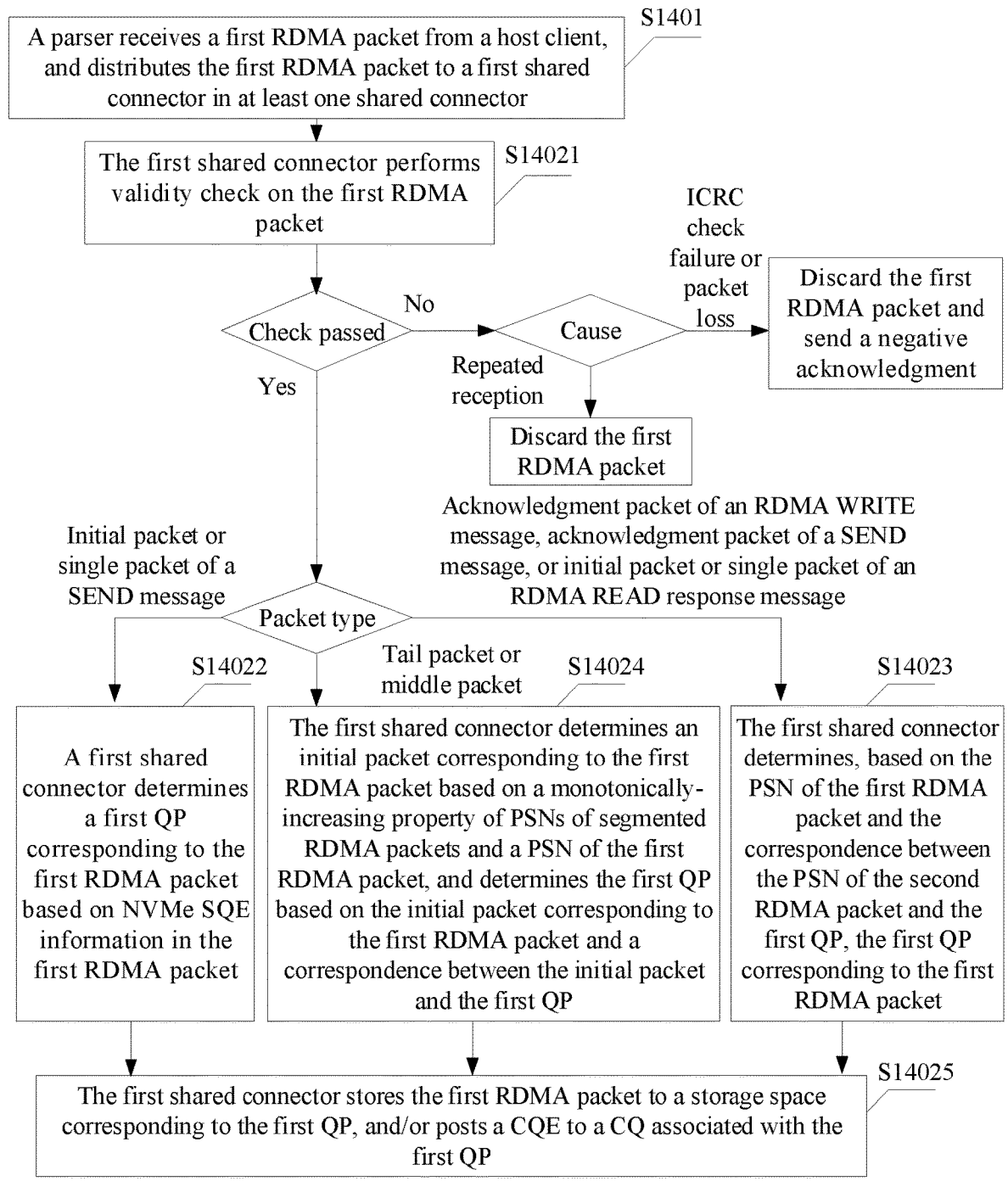
FIG. 15 is a schematic flowchart of another packet receiving method according to an embodiment of this disclosure.

As shown in FIG. 15, step S1402 includes steps S14021 to S14025.

S14021. The first shared connector performs validity check on the first RDMA packet.

Validity check includes but is not limited to ICRC check, determining whether a packet is lost, and determining whether a packet is repeatedly received. For an acknowledgment packet, validity check includes ICRC check. For another message, validity check includes ICRC check, determining whether a packet is lost, and determining whether a packet is repeatedly received.

For a QP connection of a reliable connection, PSNs of RDMA packets of a same QP connection monotonically increase. If PSNs of RDMA packets received by the first shared connector do not monotonically increase, it may be determined that packet loss occurs. If there are repeated PSNs of RDMA packets received by the first shared connector, it may be determined that a packet is repeatedly received.

If ICRC check is not passed or a packet loss occurs, the first RDMA packet is discarded, and a negative acknowledgment (NACK) is sent to the host client, so as to notify the host client to perform retransmission. If a packet is repeatedly received, the first RDMA packet is discarded. Only an RDMA packet that passes validity check is processed in a next step.

S14022. If the first RDMA packet is an initial packet or a single packet of a SEND message, the first shared connector determines a first QP corresponding to the first RDMA packet based on information in a non-volatile memory express (NVMe) submission queue entry (SQE) of the first RDMA packet.

If a first network interface card is connected to one client, and the first RDMA packet is an initial packet or a single packet of a SEND message, the first shared connector may determine the first QP corresponding to the first RDMA packet based on information in an NVMe SQE in the first RDMA packet; or if a first network interface card is connected to a plurality of clients and the first RDMA packet is an initial packet or a single packet of a SEND message, the first shared connector may determine the first QP corresponding to the first RDMA packet based on information in an NVMe SQE in the first RDMA packet and a client address or a QP connection. The first network interface card may perform load balancing on received I/O command requests from different clients based on client addresses or QP connections therein.

In this embodiment of this disclosure, an RDMA message is segmented to obtain a plurality of RDMA packets, where an initial packet refers to the first RDMA packet in the plurality of RDMA packets, a tail packet refers to the last RDMA packet in the plurality of RDMA packets, and a middle package refers to another RDMA packet in the plurality of RDMA packets. A single packet refers to an RDMA packet of an RDMA message that is not segmented. That is, the RDMA packet is a complete RDMA message.

For example, the initial packet indicates that a BTH operation code of an RDMA packet is "SEND First", "RDMA WRITE first", "RDMA READ Response first", or the like.

A single packet indicates that a BTH operation code of an RDMA packet is "SEND Only", "SEND Only with Immediate", "RDMA WRITE Only", "RDMA WRITE Only with Immediate", "RDMA READ Response Only", or the like.

Information in an NVMe SQE includes a namespace identifier (NSID) and a logical block address (LBA).

For example, if the first RDMA packet is a command message (for example, a SEND message), the first shared connector determines that the first RDMA packet is corresponding to the first QP based on NVMe SQE information (for example, an NSID and/or an LBA) in the first RDMA packet. A reason is that information in an NVMe SQE is in a many-to-one correspondence with a controller. That is, a plurality of pieces of NVMe SQE information are corresponding to one controller, so that a corresponding first controller can be determined based on the information in the NVMe SQE. However, a QP belonging to a specific controller in a QP group is unique. Therefore, a first QP in the first controller may be determined. To be specific, the information in the NVMe SQE is also in a many-to-one correspondence with the QP in the controller.

S14023. If the first RDMA packet is an acknowledgment packet of an RDMA WRITE message, an acknowledgment packet of a SEND message, or an initial packet or a single packet of an RDMA READ response message, the first shared connector determines the first QP corresponding to the first RDMA packet based on a PSN of the first RDMA packet and a correspondence between a PSN of a second RDMA packet and the first QP.

The middle packet indicates that a BTH operation code of the RDMA packet is "SEND Middle", "RDMA WRITE Middle", "RDMA READ Response Middle", and or like.

The tail packet indicates that a BTH operation code of the RDMA packet is "SEND Last", "SEND Last with Immediate", "RDMA WRITE Last", "RDMA READ Response Last", or the like.

The second RDMA packet is an RDMA packet sent by the first QP; and the PSN of the first RDMA packet is corresponding to the PSN of the second RDMA packet.

When the first RDMA packet is the acknowledgment packet of the RDMA WRITE message, the second RDMA packet belongs to an RDMA WRITE message, and the PSN of the first RDMA packet is the same as the PSN of the second RDMA packet.

When the first RDMA packet is the acknowledgment packet of the SEND message, the second RDMA packet belongs to a SEND message, and the PSN of the first RDMA packet is the same as the PSN of the second RDMA packet.

When the first RDMA packet is the initial packet or the single packet of the RDMA READ response message, the second RDMA packet belongs to an RDMA READ request message, and the PSN of the first RDMA packet and the PSN of the second RDMA packet are monotonically increasing. For example, assuming that the PSN of the second RDMA packet is 1, the PSN of the first RDMA packet monotonically increases starting from 1.

That is, a QP requests to send a second RDMA packet that belongs to a data operation or a command response of an I/O command request (for example, an RDMA WRITE message, a SEND message, or an RDMA READ request message), so that the first shared connector can store a correspondence between a PSN of the second RDMA packet and the QP (referred to as a second QP in the following). Then, the first shared connector receives a first RDMA packet belonging to a message of a same I/O operation (an acknowledgment packet of the RDMA WRITE message, an acknowledgment packet of the SEND message, or an RDMA READ response message). A PSN of the first RDMA packet is corresponding to the PSN of the second RDMA packet, and the first shared connector determines the PSN of the corresponding second RDMA packet by using the PSN of the first RDMA packet. Then, a second QP that has requested to send the second RDMA packet may be determined based on a correspondence between the PSN of the second RDMA packet and the second QP. In this case, the second QP and the first QP are a same QP.

In addition, for steps S14022 and S14023, if the first RDMA packet is an initial packet, the first shared connector may store a correspondence between an initial packet of a message to which the first RDMA packet belongs and the first QP. That is, a correspondence between the initial packet of the message to which the first RDMA packet belongs and the first controller to which the first QP belongs is stored. For example, a correspondence between the PSN of the first RDMA packet and an identifier of the first controller to which the first QP belongs is stored, so that the first shared connector can match a subsequent RDMA packet (a middle packet or a tail packet) that belongs to the same message as the first RDMA packet to the corresponding first controller and first QP.

S14024. If the first RDMA packet is a tail packet or a middle packet, the first shared connector determines an initial packet corresponding to the first RDMA packet based on a monotonically-increasing property of PSNs of segmented RDMA packets and the PSN of the first RDMA packet, and determines the first QP based on the initial packet corresponding to the first RDMA packet and a correspondence between the initial packet and the first QP.

Figure 4:
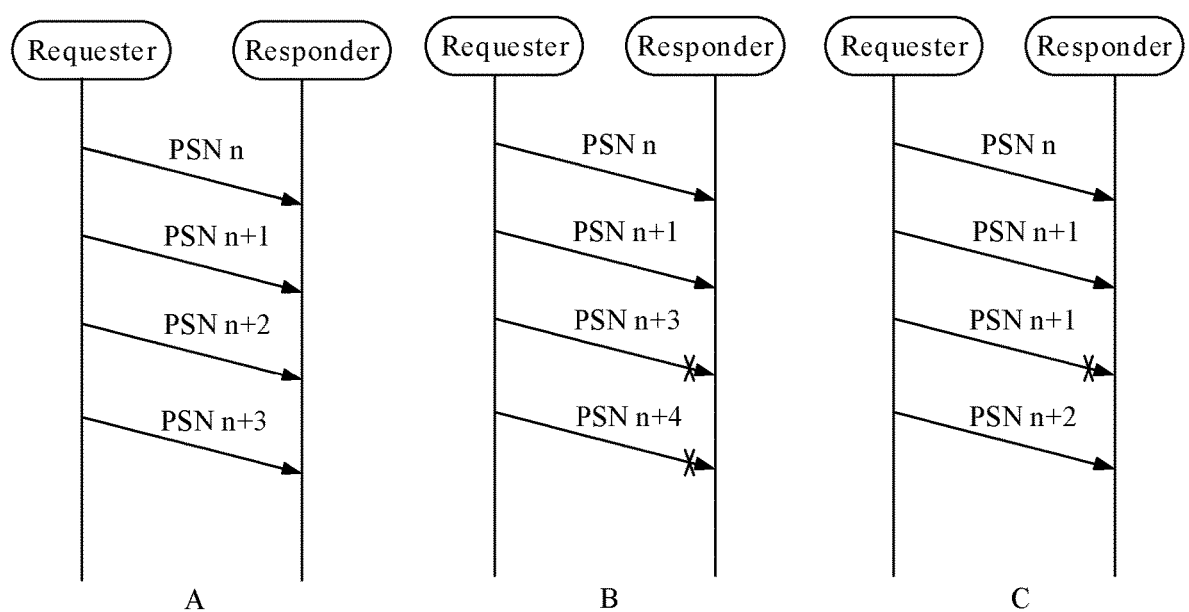
FIG. 4 is a schematic diagram of monotonic increasing of PSNs of an RDMA packet according to an embodiment of this disclosure.

As described in FIG. 4, PSNs of RDMA packets after a message is segmented monotonically increase. Therefore, for an RDMA packet that is a tail packet or a middle packet, an initial packet of a same message can be determined by using the PSN of the RDMA packet. The first QP may be determined with reference to the correspondence between the initial packet and the first QP.

S14025. The first shared connector stores the first RDMA packet to a storage space corresponding to the first QP, and/or posts a CQE to a CQ associated with the first QP.

After the first QP corresponding to the first RDMA packet is determined, a process in which the first shared connector communicates with the first controller may include the following: The first shared connector stores the first RDMA packet to the storage space corresponding to the first QP, and/or posts the CQE to the CQ associated with the first QP.

The CQE is used to indicate an RDMA operation corresponding to the first RDMA packet (for example, a SEND operation, an RDMA WRITE operation, or an RDMA READ operation) is completed. The first QP is a QP corresponding to a QP connection that is of one controller in the at least one controller and that is corresponding to the first shared connector. A QP that belongs to a specific controller in one QP group is unique, and one QP group is corresponding to one QP connection. Therefore, the first QP may be corresponding to the QP connection corresponding to the first shared connector.

The storage space corresponding to the first QP may also be a storage space corresponding to a controller in which the first QP is located. For example, an RDMA SEND message that carries an I/O command may be stored in a storage space pointed to by a WQE of an RQ of the first QP. An RDMA READ response message that carries an I/O write data may be stored in a storage space that is requested by the controller of the first QP when the controller sends the RDMA READ message rather than the storage space pointed to by the WQE of the RQ of the QP.

Specifically, if the first RDMA packet is not an acknowledgment packet, the first shared connector stores the first RDMA packet to the storage space corresponding to the first QP. If the first RDMA packet is a tail packet, a single packet, or an acknowledgment packet, the first shared connector posts a CQE to the CQ associated with the first QP. If the first RDMA packet is a tail packet or a single packet, the first shared connector stores the first RDMA packet to the storage space corresponding to the first QP, and posts the CQE to the CQ associated with the first QP.

That is, if the first RDMA packet is an acknowledgment (ACK) packet of an RDMA packet, the first shared connector does not store the first RDMA packet to the storage space corresponding to the first QP, and only posts a CQE to the CQ associated with the first QP, indicating that a corresponding RDMA operation is completed. If the first RDMA packet is an initial packet or a middle packet of a SEND message or an RDMA READ response message, the first shared connector stores only the first RDMA packet to the storage space corresponding to the first QP because the RDMA operation has not been completed. Therefore, no CQE is posted to the CQ associated with the first QP. When the first RDMA packet is a single packet or a tail packet of a SEND message or an RDMA READ response message, the first RDMA packet is stored in the storage space corresponding to the first QP because a corresponding RDMA operation has been completed. A CQE is also posted to the CQ associated with the first QP.

For example, if the first RDMA packet is a tail packet or a single packet of a SEND message, the first shared connector stores the tail packet or the single packet of the SEND message in the storage space, and posts a CQE to the CQ associated with the first QP. The CQE is used to indicate that the SEND message has been received.

For example, if the first RDMA packet is an initial packet or a middle packet of a SEND message, the first shared connector stores the initial packet or the middle packet of the SEND message to the storage space without posting a CQE.

For example, when the first RDMA packet is a tail packet or a single packet of the RDMA READ response message, the first shared connector stores the tail packet or the single packet of the RDMA READ response message to the storage space, and posts a CQE to the CQ associated with the first QP. The CQE is used to indicate an RDMA read operation has been completed.

For example, when the first RDMA packet is an initial packet or a middle packet of an RDMA READ response message, the first shared connector stores the initial packet or the middle packet of the RDMA READ response message to the storage space without posting a CQE For example, if the first RDMA packet is an acknowledgment packet of a SEND message or an acknowledgment packet of an RDMA WRITE message, the storage apparatus posts a CQE to the CQ associated with the first QP. The CQE is used to indicate that a SEND operation or an RDMA WRITE operation has been completed.

Embodiments of this application provide the network interface card and the storage apparatus. The network interface card includes the parser and the at least one shared connector, and the parser is configured to distribute the received first remote direct memory access RDMA packet to the first shared connector in the at least one shared connector. The first shared connector is configured to establish the QP connection to the peer network device, and determine the first queue pair QP corresponding to the first controller based on the first RDMA packet, so as to implement communication with the first controller. The first shared connector is separately connected to the plurality of controllers including the first controller. In addition, the QP corresponding to each of the plurality of controllers is corresponding to the first shared connector. Only a shared connector of the storage apparatus is visible to the host client. However, the first shared connector may distribute the received RDMA packet received from the host client to controllers where different QPs are located for processing, so that a controller that cannot work normally can be masked. As long as one controller works normally, it can be ensured that the storage apparatus can provide a storage service. Therefore, reliability of the storage apparatus using an RDMA network can be improved. In addition, different I/O command requests are distributed to controllers in which different QPs are located for parallel processing. Compared with an existing solution in which RDMA messages connected to a same QP can be processed only by one fixed controller, performance of the network interface card can be improved by N times, where N is a quantity of controllers. Therefore, storage access performance of a single QP connection can be improved.

Figure 16:
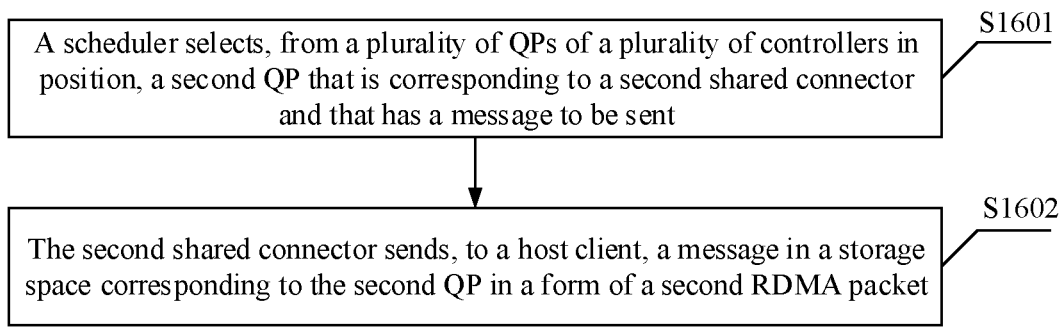
FIG. 16 is a schematic flowchart of a packet sending method according to an embodiment of this disclosure.

For message sending, the network interface card of the storage apparatus may perform a packet sending method shown in FIG. 16. The method includes the following steps:

S1601. A scheduler selects, from a plurality of QPs of a plurality of controllers in position, a second QP that is corresponding to a second shared connector and that has a message to be sent.

The second shared connector is one of at least one shared connector.

The scheduler first obtains a doorbell signal of at least one QP from the plurality of controllers.

As previously described, each controller is corresponding to one QP, each QP includes one SQ, and the SQ includes a WQE. The doorbell signal is used to indicate that there is a message to be sent (a data message or a command message) in a storage space pointed to by the WQE in the SQ of the QP of the corresponding controller.

When a specific controller has a message to be transmitted, one or more WQEs are added to an SQ of a QP of the controller and the WQE points to a storage space of the message to be transmitted. The QP generates the doorbell signal, and the scheduler obtains the doorbell signal.

The scheduler aggregates doorbell signals from QPs, and does not directly trigger sending of an RDMA message, but selects a doorbell signal from the QPs based on a preset rule to respond, where a corresponding QP is a second QP, and a controller in which the second QP is located needs to work normally.

A specific preset rule is not limited in this application. In a possible implementation, the scheduler may select the second QP from a plurality of QPs (located in different controllers) corresponding to the second shared connector by using round robin (RR).

Figure 17:
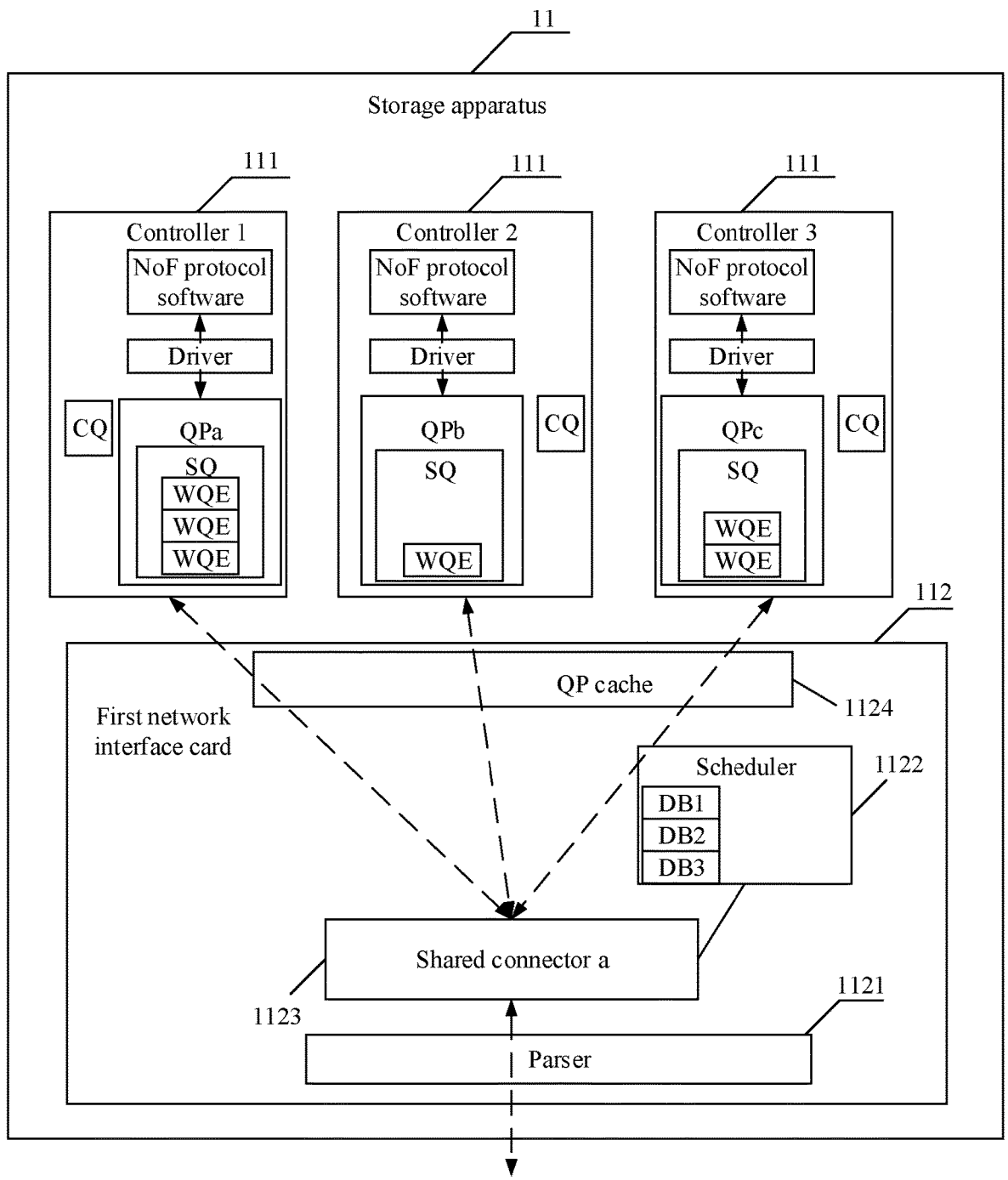
FIG. 17 is a schematic diagram of scheduling based on an RR algorithm according to an embodiment of this disclosure.

For example, as shown in FIG. 17, it is assumed that a QPa of a controller 1, a QPb of a controller 2, a QPc of a controller 3, and a shared connector a belong to a same QP group. If an SQ of the QPa of the controller 1 has three WQEs (that is, three messages in a storage space are to be transmitted), a depth of the scheduler for a doorbell signal DB1 of the QPa is 3. If an SQ of the QPb of the controller 2 has one WQE (that is, one message in a storage space is to be transmitted), a depth of the scheduler for a doorbell signal DB2 of the QPb is 1. If an SQ of the QPc of the controller 3 has two WQEs (that is, two messages in a storage space are to be transmitted), a depth of the scheduler for a doorbell signal DB3 of the QPc is 2.

According to an RR principle, WQEs of the QPa, the QPb, and the QPc are scheduled sequentially in the first round. That is, the QPa, the QPb, and the QPc are sequentially used as the second QP, and a message in a storage space pointed to by a corresponding WQE is sent. In this case, the depth of the DB1 becomes 2, the depth of the DB2 becomes 0, and the depth of the DB3 becomes 1. The depth of the DB2 is 0, indicating that no message needs to be sent. In the second round of scheduling, the QPa and the QPc are successively used as the second QP, and a message in a storage space pointed to by a corresponding WQE is sent. In this case, the depth of the DB1 becomes 1. The depth of the DB3 becomes 0, indicating that no message needs to be sent. In the third round of scheduling, the QPa is used as the second QP, and a message in a storage space pointed to by a corresponding WQE is sent. In this case, the depth of the DB1 becomes 0, indicating that no message needs to be sent.

The preset rule may alternatively include another manner, for example, weighted round robin (WRR) or dynamic weighted round robin (dynamic weighted round robin, DWRR). Regardless of the preset rule, a QP of a controller that is not in position and a QP that is idle may be skipped during scheduling.

S1602. The second shared connector sends, to a host client, a message in a storage space corresponding to the second QP in a form of a second RDMA packet.

Similar to step S1401, before the second shared connector sends an RDMA packet, a peer network device (for example, the host client) discovers a storage apparatus in a front-end fabric, and establishes at least one QP connection to the second shared connector of the storage apparatus by using at least one QP. In this way, the host client and the storage apparatus can transmit data to each other through the QP connection.

Specifically, the storage space corresponding to the second QP is a storage space pointed to by a WQE in an SQ of the second QP. The second QP may be the same as or different from a first QP.

As described above, the second shared connector segments a message into RDMA packets before sending the message, and a granularity of scheduling between QPs of different controllers in a same QP group is based on the WQE. To be specific, after a QP is scheduled, all messages stored in a storage space pointed to by a WQE need to be continuously sent, and cannot be interrupted by another QPs in the same QP group. Scheduling between different QP groups is independent and does not affect each other.

When sending RDMA messages of a plurality of QPs in a local QP group, the second shared connector uses a same set of PSNs, that is, PSNs carried in RDMA messages of different QPs in the local QP group are obtained by monotonically increasing a same counter. In this way, a network interface card of the host client considers that these RDMA packets come from one QP of the storage apparatus.

In addition, if the second RDMA packet belongs to an RDMA WRITE message, a SEND message, or an RDMA READ request message, the second shared connector stores a correspondence between a PSN of the second RDMA packet and the second QP. Therefore, as described in step S14023, the network interface card determines the first QP based on the PSN of the first RDMA packet when receiving the first RDMA packet.

Embodiments of this application provide the network interface card and the storage apparatus, where the network interface card includes the scheduler and the at least one shared connector, and the scheduler is configured to select, from the plurality of QPs of the plurality of controllers in position, the second QP that is corresponding to the second shared connector and has the message to be sent, where the second shared connector is one of the at least one shared connector; the second shared connector is configured to establish the QP connection to the peer network device, and send, to the host client, the message in the storage space corresponding to the second QP in the form of the second RDMA packet; and the second shared connector is separately connected to the plurality of controllers, and the QP corresponding to each of the plurality of controllers is corresponding to the second shared connector. The scheduler may select one QP from the plurality of QPs, and a corresponding second shared connector processes an RDMA message to be sent by the QP, so that a storage service can be provided as long as one controller can work normally. Therefore, reliability of the storage apparatus using an RDMA network can be improved. In addition, controllers in which different QPs are located can perform parallel processing on different I/O command requests. Compared with an existing solution in which RDMA messages connected to a same QP can be processed only by one fixed controller, performance of the network interface card can be improved by N times, where N is a quantity of controllers. Therefore, storage access performance of a single QP connection can be improved.

Figure 18A:
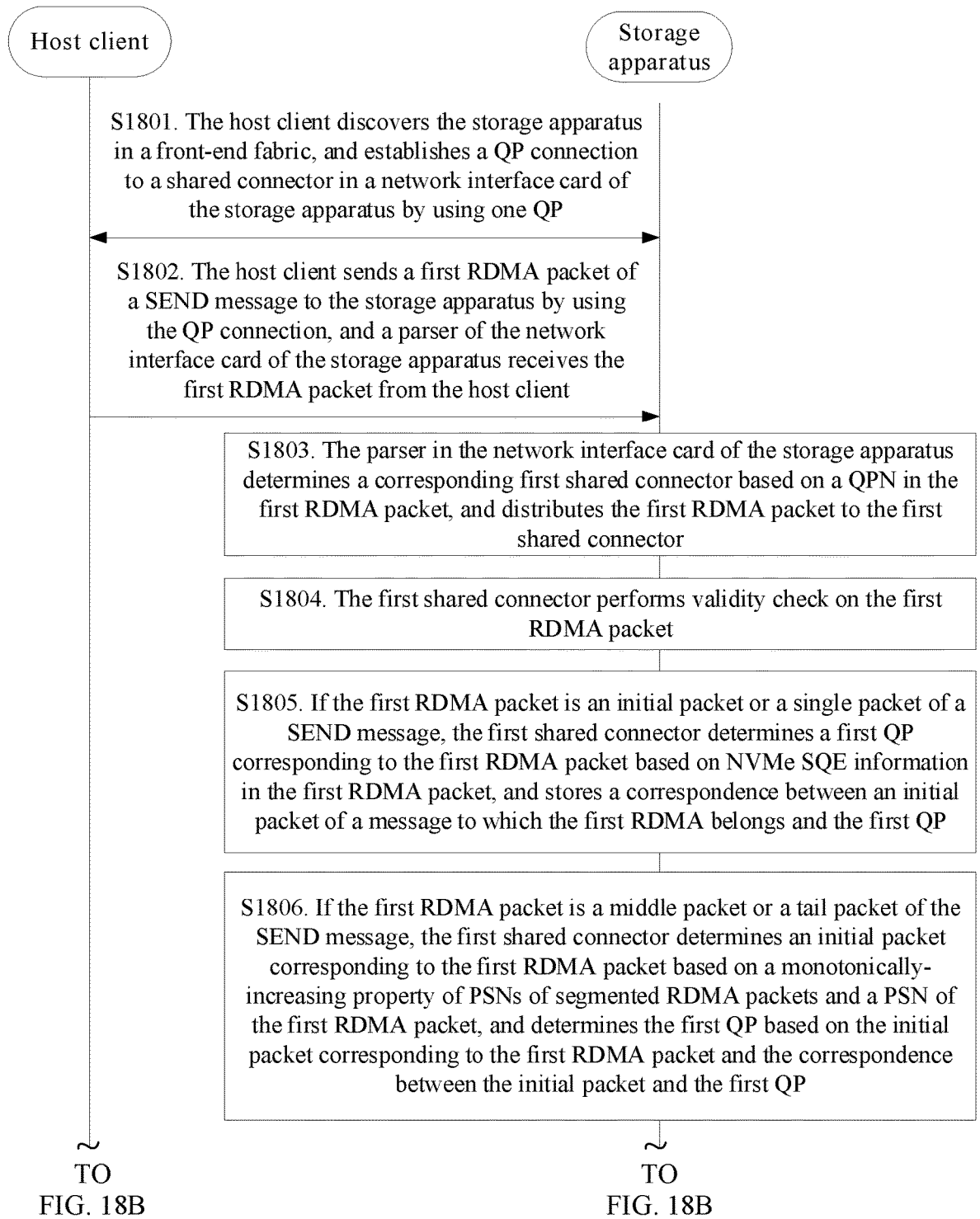

Similar to the I/O read/write process in FIG. 11, a process in which the host client and the storage apparatus implement I/O read/write by using the foregoing packet receiving method and packet sending method is shown in FIG. 18A and FIG. 18B.

S1801. The host client discovers the storage apparatus in a front-end fabric, and establishes a QP connection to a shared connector in a network interface card of the storage apparatus by using one QP.

S1802. The host client sends a first RDMA packet of a SEND message to the storage apparatus by using the QP connection. A parser of the network interface card of the storage apparatus receives the first RDMA packet from the host client.

The SEND message may include an I/O write command or an I/O read command. That is, a data payload of the SEND message may be an I/O write command or an I/O read command.

For content of this step, refer to step S1401.

S1803. The parser in the network interface card of the storage apparatus determines a corresponding first shared connector based on a QPN in the first RDMA packet, and distributes the first RDMA packet to the first shared connector.

For content of this step, refer to step S1401.

S1804. The first shared connector performs validity check on the first RDMA packet.

For content of this step, refer to step S14021.

S1805. If the first RDMA packet is an initial packet or a single packet of a SEND message, the first shared connector determines a first QP corresponding to the first RDMA packet based on NVMe SQE information (for example, an NSID and/or an LBA) in the first RDMA packet, and store a correspondence between an initial packet of a message to which the first RDMA packet belongs and the first QP.

For content of this step, refer to steps S14022 and S14023.

S1806. If the first RDMA packet is a middle packet or a tail packet of a SEND message, the first shared connector determines an initial packet corresponding to the first RDMA packet based on a monotonically-increasing property of PSNs of segmented RDMA packets and a PSN of the first RDMA packet, and determines the first QP based on the initial packet corresponding to the first RDMA packet and a correspondence between the initial packet and the first QP.

For content of this step, refer to step S14024.

S1807. The first shared connector stores the first RDMA packet to a storage space corresponding to the first QP, and/or posts a CQE to a CQ associated with the first QP.

For content of this step, refer to step S14025.

S1808. A consumer (for example, NoF protocol software) of a controller in which the first QP is located queries the newly-posted CQE in the CQ, parses the NVMe SQE information, and initiates data exchange.

If the NVMe SQE information includes an I/O read command, after reading I/O data from a back-end storage medium, the consumer posts a WQE of an RDMA WRITE operation to an SQ of the QP, and generates a doorbell signal to notify the network interface card that a message is to be transmitted. In addition, the consumer may post a WQE of the SEND operation after posting the WQE of the RDMA WRITE operation to the SQ of the QP.

If the NVMe SQE information includes an I/O write command, the consumer posts a WQE of an RDMA READ operation to the SQ of the QP and generates a doorbell signal to notify the network interface card that an RDMA READ message is to be transmitted.

If the NVMe SQE information includes an I/O write command with immediate data, after completing persistent storage of the I/O data, the consumer constructs a NoF command response message, and posts the WQE of the SEND operation to the SQ of the QP, and generates a doorbell signal to notify the network interface card that a SEND message is to be transmitted.

S1809. A scheduler aggregates doorbell signals from QPs, and selects, from a plurality of QPs of a plurality of controllers in position, a second QP that is corresponding to a second shared connector and that has a message to be sent.

For content of this step, refer to step S1601.

S1810. The second shared connector sends, to the host client, a message in a storage space corresponding to the second QP in a form of a second RDMA packet.

For content of this step, refer to step S1602.

S1811. The second shared connector posts a CQE to a CQ associated with the second QP.

If a WQE of an SQ of the second QP indicates a SEND operation or an RDMA WRITE operation, the CQE is posted to the CQ associated with the second QP after the second shared connector receives an acknowledgment packet from the host client.

If the WQE of the SQ of the second QP indicates an RDMA READ operation, the CQE is posted to the CQ associated with the second QP after the second shared connector receives a tail packet or a single packet of an RDMA READ response message from the host client.

If the WQE of the SQ of the second QP indicates the RDMA READ operation, when sending a second RDMA packet belonging to an RDMA READ request message, the second shared connector stores a correspondence between a PSN of the second RDMA packet and the second QP. If the first RDMA packet received by the second shared connector is an initial packet or a single packet of an RDMA READ response message, the second shared connector determines the second QP (that is, the first QP) based on the PSN of the first RDMA packet and the correspondence between the PSN of the second RDMA packet and the second QP, and stores a correspondence between an initial packet of a message to which the first RDMA packet belongs and the first QP. If the first RDMA packet is a tail packet or a middle packet of an RDMA READ response message, the second shared connector determines an initial packet corresponding to the first RDMA packet based on a monotonically-increasing property of PSNs of segmented RDMA packets and the PSN of the first RDMA packet, and determines the first QP (that is, the second QP) based on the initial packet corresponding to the first RDMA packet and the correspondence between the initial packet and the first QP.

S1812. A consumer (for example, NoF protocol software) of the controller in which the second QP is located queries the newly-posted CQE in the CQ.

If the newly-posted CQE indicates that the sending process in the SEND operation is completed, indicating that an I/O operation is completed in this case, the consumer reclaims a WQE resource in the related SQ and a CQE resource in the related CQ.

If the newly-posted CQE indicates that the RDMA WRITE operation is completed, the consumer reclaims the WQE resources in the related SQ and the CQE resources in the related CQ.

If the newly-posted CQE indicates that the RDMA READ operation is completed, after completing persistent storage of the I/O data, the consumer constructs a NoF command response message, and posts the WQE of the SEND operation to the SQ of the QP, and generates a doorbell signal to notify the network interface card that a message is to be transmitted. The process jumps to step S1809.

In FIG. 18A and FIG. 18B, the first QP refers to a QP in a process of receiving a message, the second QP refers to a QP in a process of sending a message, and the first QP and the second QP may be a same QP.

The first shared connector and the second shared connector in FIG. 18A and FIG. 18B may be a same shared connector.

It should be understood that sequence numbers of the foregoing processes do not mean execution sequences in various embodiments of this application. The execution sequences of the processes should be determined by functions and internal logic of the processes, and should not be construed as any limitation on the implementation processes of embodiments of this application.

A person of ordinary skill in the art may be aware that units and algorithm steps in the examples described with reference to embodiments disclosed in this specification can be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit described above, refer to a corresponding process in the foregoing method embodiments, and details are not described herein again.

In the several embodiments provided in this application, it should be understood that the disclosed system, device, and method may be implemented in other manners. For example, the described device embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the devices or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on an actual requirement to achieve the objectives of the solutions in embodiments.

In addition, functional units in embodiments of this application may be integrated into one processing unit, or each of the units may exist alone physically, or two or more units are integrated into one unit.

All or some of the foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, an SSD).

The foregoing descriptions are merely specific implementations of this application, but are not intended to limit a protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network interface card (NIC), comprising:
    a parser; and
    at least one shared connector, wherein:
        the parser is configured to distribute a received first remote direct memory access (RDMA) packet to a first shared connector of the at least one shared connector; and
        the NIC is configured to establish a queue pair (QP) connection to a peer network device via the first shared connector, and determine a first QP corresponding to a first controller based on the first RDMA packet, so as to implement communication with the first controller, wherein the first shared connector is separately connected to a plurality of controllers comprising the first controller, and one QP corresponding to each of the plurality of controllers is corresponding to the first shared connector.

2. The network interface card according to claim 1, wherein the first shared connector is further configured to:
    if the first RDMA packet is not an acknowledgment packet, store the first RDMA packet to a storage space corresponding to the first QP.

3. The network interface card according to claim 1, wherein the first shared connector is further configured to:
    if the first RDMA packet is a tail packet, a single packet, or an acknowledgment packet, post a completion queue entry (CQE) to a completion queue (CQ) associated with the first QP, wherein the CQE is used to indicate that an RDMA operation corresponding to the first RDMA packet is completed.

4. The network interface card according to claim 1, wherein the first shared connector is specifically configured to:
    if the first RDMA packet is an initial packet or a single packet of a SEND message, determine the first QP based on information in a non-volatile memory express (NVMe) submission queue entry (SQE) in the first RDMA packet; wherein
    the information in the NVMe SQE is corresponding to the first controller.

5. The network interface card according to claim 1, wherein the first shared connector is specifically configured to:
    if the first RDMA packet is an acknowledgment packet of an RDMA WRITE message, an acknowledgment packet of a SEND message, or an initial packet or a single packet of an RDMA READ response message, determine the first QP based on a packet sequence number of the first RDMA packet and a correspondence between a packet sequence number of a second RDMA packet and the first QP; wherein
    the second RDMA packet is an RDMA packet sent by the first QP; the packet sequence number of the first RDMA packet is corresponding to the packet sequence number of the second RDMA packet; when the first RDMA packet is the acknowledgment packet of the RDMA WRITE message, the second RDMA packet belongs to an RDMA WRITE message; when the first RDMA packet is the acknowledgment packet of the SEND message, the second RDMA packet belongs to a SEND message; and when the first RDMA packet is the initial packet or the single packet of the RDMA READ response message, the second RDMA packet belongs to an RDMA READ request message.

6. The network interface card according to claim 4, wherein the first shared connector is further configured to:
if the first RDMA packet is an initial packet, store a correspondence between an initial packet of a message to which the first RDMA packet belongs and the first QP.

7. The network interface card according to claim 6, wherein the first shared connector is further configured to:
if the first RDMA packet is a tail packet or a middle packet, determine an initial packet corresponding to the first RDMA packet based on a monotonically-increasing property of packet sequence numbers of segmented RDMA packets and the packet sequence number of the first RDMA packet; and
determine the first QP based on the initial packet corresponding to the first RDMA packet and the correspondence.

8. A network interface card, comprising a scheduler and at least one shared connector, wherein
the scheduler is configured to select, from a plurality of queue pairs QPs of a plurality of controllers in position, a second QP that is corresponding to a second shared connector and has a message to be sent, wherein the second shared connector is one of the at least one shared connector;
the second shared connector is configured to establish a QP connection to a peer network device, and send, to a host client, a message in a storage space corresponding to the second QP in a form of a second remote direct memory access RDMA packet; and the second shared connector is separately connected to the plurality of controllers, and one QP corresponding to each of the plurality of controllers is corresponding to the second shared connector.

9. The network interface card according to claim 8, wherein the second shared connector is further configured to:
if the second RDMA packet belongs to an RDMA WRITE message, a SEND message, or an RDMA READ request message, store a correspondence between a packet sequence number of the second RDMA packet and the second QP.

10. The network interface card according to claim 8, wherein the scheduler is specifically configured to:
select the second QP from a plurality of QPs corresponding to the second shared connector by using round robin.

11. A packet receiving method, applied to the network interface card according to claim 1, wherein the method comprises:
distributing, by a parser, a received first remote direct memory access RDMA packet to a first shared connector in at least one shared connector; and
establishing, by the first shared connector, a QP connection to a peer network device, and determining a first queue pair QP corresponding to a first controller based on the first RDMA packet, so as to implement communication with the first controller, wherein the first shared connector is separately connected to a plurality of controllers comprising the first controller, and one QP corresponding to each of the plurality of controllers is corresponding to the first shared connector.

12. The method according to claim 11, further comprising:
if the first RDMA packet is not an acknowledgment packet, storing, by the first shared connector, the first RDMA packet to a storage space corresponding to the first QP.

13. The method according to claim 11, further comprising:
if the first RDMA packet is a tail packet, a single packet, or an acknowledgment packet, posting, by the first shared connector, a completion queue entry CQE to a completion queue CQ associated with the first QP, wherein the CQE is used to indicate that an RDMA operation corresponding to the first RDMA packet is completed.

14. The method according to claim 11, wherein the determining a first queue pair QP corresponding to a first controller based on the first RDMA packet comprises:
if the first RDMA packet is an initial packet or a single packet of a SEND message, determining, by the first shared connector, the first QP based on information in a non-volatile memory express (NVMe) submission queue entry (SQE) in the first RDMA packet; wherein the information in the NVMe SQE is corresponding to the first controller.

15. The method according to claim 11, wherein the determining a first queue pair QP corresponding to a first controller based on the first RDMA packet comprises:
if the first RDMA packet is an acknowledgment packet of an RDMA WRITE message, an acknowledgment packet of a SEND message, or an initial packet or a single packet of an RDMA READ response message, determining, by the first shared connector, the first QP based on a packet sequence number of the first RDMA packet and a correspondence between a packet sequence number of a second RDMA packet and the first QP; wherein
the second RDMA packet is an RDMA packet sent by the first QP; the packet sequence number of the first RDMA packet is corresponding to the packet sequence number of the second RDMA packet; when the first RDMA packet is the acknowledgment packet of the RDMA WRITE message, the second RDMA packet belongs to an RDMA WRITE message; when the first RDMA packet is the acknowledgment packet of the SEND message, the second RDMA packet belongs to a SEND message; and when the first RDMA packet is the initial packet or the single packet of the RDMA READ response message, the second RDMA packet belongs to an RDMA READ request message.

16. The method according to claim 14, further comprising:
if the first RDMA packet is an initial packet, storing, by the first shared connector, a correspondence between an initial packet of a message to which the first RDMA packet belongs and the first QP.

17. The method according to claim 16, further comprising:
if the first RDMA packet is a tail packet or a middle packet, determining, by the first shared connector, an initial packet corresponding to the first RDMA packet based on a monotonically-increasing property of packet sequence numbers of segmented RDMA packets and the packet sequence number of the first RDMA packet; and
determining the first QP based on the initial packet corresponding to the first RDMA packet and the correspondence.

18. A packet sending method, applied to the network interface card according to claim 8, wherein the method comprises:

selecting, by a scheduler from a plurality of queue pairs QPs of a plurality of controllers in position, a second QP that is corresponding to a second shared connector and has a message to be sent, wherein the second shared connector is one of at least one shared connector; and establishing, by the second shared connector, a QP connection to a peer network device, and sending, to a host client, a message in a storage space corresponding to the second QP in a form of a second remote direct memory access RDMA packet; wherein the second shared connector is separately connected to the plurality of controllers, and one QP corresponding to each of the plurality of controllers is corresponding to the second shared connector.

19. The method according to claim 18, further comprising:

if the second RDMA packet belongs to an RDMA WRITE message, a SEND message, or an RDMA READ request message, storing, by the second shared connector, a correspondence between a packet sequence number of the second RDMA packet and the second QP.

20. A storage apparatus, comprising a network interface card (NIC) and a plurality of controllers, wherein the network interface card is separately connected to each of the plurality of controllers, and the network interface card comprise a parser and at least one shared connector, wherein the parser is configured to distribute a received first RDMA packet to a first shared connector in the at least one shared connector; and the storage apparatus is configured to establish a QP connection to a peer network device via the first shared connector, and determine a first QP corresponding to a first controller based on the first RDMA packet, so as to implement communication with the first controller, wherein the first shared connector is separately connected to a plurality of controllers comprising the first controller, and one QP corresponding to each of the plurality of controllers is corresponding to the first shared connector.

* * * * *